(12) United States Patent
Ibañez Moreira et al.

(10) Patent No.: US 10,518,827 B2
(45) Date of Patent: Dec. 31, 2019

(54) AERODYNAMIC SYSTEM FOR A WHEEL HOUSING OF A VEHICLE

(71) Applicant: BATZ, S.COOP., Igorre (ES)

(72) Inventors: Jesús Ibañez Moreira, Derio (ES); Iñaki Aguirre Pichel, Santurtzi (ES)

(73) Assignee: BATZ, S.COOP., Igorre (ES)

( * ) Notice: Subject to any disclaimer, the term of this patent is extended or adjusted under 35 U.S.C. 154(b) by 0 days.

(21) Appl. No.: 16/169,361

(22) Filed: Oct. 24, 2018

(65) Prior Publication Data

US 2019/0118874 A1 Apr. 25, 2019

(30) Foreign Application Priority Data

Oct. 25, 2017 (EP) .................................... 17382717

(51) Int. Cl.
| | | |
|---|---|---|
| *B62D 35/02* | (2006.01) | |
| *B60T 5/00* | (2006.01) | |
| *B62D 25/16* | (2006.01) | |
| *B62D 35/00* | (2006.01) | |
| *F16D 65/827* | (2006.01) | |

(Continued)

(52) U.S. Cl.
CPC ............... *B62D 35/02* (2013.01); *B60T 5/00* (2013.01); *B62D 25/16* (2013.01); *B62D 25/182* (2013.01); *B62D 35/00* (2013.01); *B62D 37/02* (2013.01); *F16D 65/807* (2013.01); *F16D 65/827* (2013.01); *F16D 65/847* (2013.01); *F16D 2065/783* (2013.01)

(58) Field of Classification Search
CPC .... B60T 5/00; F16D 65/847; F16D 2065/783; B60B 2900/513
See application file for complete search history.

(56) References Cited

U.S. PATENT DOCUMENTS 8,631,889 B2 * 1/2014 Begleiter .................. B60T 5/00
                                                180/68.1
8,794,363 B2 * 8/2014 Wolf ..................... B60K 11/085
                                                180/68.1

(Continued)

FOREIGN PATENT DOCUMENTS

DE    102010053463 A1    6/2012
DE    102012102445 A1    9/2013

(Continued)

OTHER PUBLICATIONS

European Search Report in corresponding European Application No. EP17382717.1, dated Apr. 11, 2018.

*Primary Examiner* — Brian L Swenson
(74) *Attorney, Agent, or Firm* — Edell, Shapiro & Finnan, LLC.

(57) ABSTRACT

An aerodynamic system for a wheel housing of a vehicle that according to one embodiment includes a flap that can be displaced between a deployed position and a retracted position, a rotating actuator, and a transmission mechanism coupled to the actuator and configured for transmitting the movement of the actuator to the flap. The aerodynamic system also includes at least one air flow shutter device in the wheel housing, where the shutter device faces at least one air duct and where the shutter device can be displaced between a closed position and an open position. The transmission mechanism is also configured for transmitting the movement of the actuator to the shutter device.

19 Claims, 15 Drawing Sheets

(51) Int. Cl.
    *B62D 25/18* (2006.01)
    *B62D 37/02* (2006.01)
    *F16D 65/807* (2006.01)
    *F16D 65/847* (2006.01)
    *F16D 65/78* (2006.01)

(56) References Cited

U.S. PATENT DOCUMENTS

| | | | |
|---|---|---|---|
| 9,487,251 B2* | 11/2016 | Gibson | F16D 65/847 |
| 9,669,885 B1* | 6/2017 | Fahland | B62D 37/02 |
| 9,694,858 B2* | 7/2017 | Wolf | B62D 37/02 |
| 2012/0071075 A1* | 3/2012 | Wolf | B60T 5/00 |
| | | | 454/162 |
| 2013/0233658 A1* | 9/2013 | Carmassi | F16D 65/853 |
| | | | 188/264 R |
| 2014/0262644 A1 | 9/2014 | Browne et al. | |
| 2017/0299006 A1* | 10/2017 | Shi | B62D 35/02 |
| 2018/0264931 A1* | 9/2018 | Chae | B60K 11/08 |
| 2019/0031160 A1* | 1/2019 | McMillan | B60T 5/00 |

FOREIGN PATENT DOCUMENTS

| | | | |
|---|---|---|---|
| FR | 2897038 A1 | 8/2007 | |
| FR | 2959195 A1 | 10/2011 | |
| WO | 2017098106 A1 | 6/2017 | |

\* cited by examiner

AERODYNAMIC SYSTEM FOR A WHEEL HOUSING OF A VEHICLE

CROSS-REFERENCE TO RELATED APPLICATIONS

This application relates to and claims the benefit and priority to European Application No. EP17382717.1, filed Oct. 25, 2017.

TECHNICAL FIELD

The present invention relates to aerodynamic systems for the wheel housing of vehicles, and to motor vehicles incorporating the aerodynamic systems.

BACKGROUND

Aerodynamic systems for the wheel housing of motor vehicles are known. FR2897038A1 describes an aerodynamic system for a wheel housing of a vehicle comprising a flap that can be displaced between a deployed position and a retracted position, a rotating actuator and a transmission mechanism coupled to the actuator and configured for transmitting the movement of the actuator to the flap.

SUMMARY OF THE DISCLOSURE

Aerodynamic systems are disclosed that comprise a flap that can be displaced between a deployed position and a retracted position, a rotating actuator and a transmission mechanism coupled to the actuator and configured for transmitting the movement of the actuator to the flap.

The aerodynamic systems further comprise at least one air flow shutter device in the wheel housing, where the shutter device is facing at least one air duct and where the shutter device can be displaced between a closed position and an open position.

The transmission mechanism is also configured for transmitting the movement of the actuator to the shutter device, not just to the displaceable flap, as mentioned above.

An aerodynamic system for a wheel housing incorporating both a displaceable flap and a shutter device is thereby obtained, both elements being controlled through the same actuator.

These and other advantages and features will become evident in view of the drawings and detailed description.

DETAILED DESCRIPTION

An aerodynamic system 1 is provided that is configured for being arranged in the wheel housing 11 of a vehicle. The wheel housing 11 of a vehicle is the part of the chassis surrounding the hollow space in which each of the wheels of the vehicle is arranged, as partially shown in FIG. 1.

Figure 1:
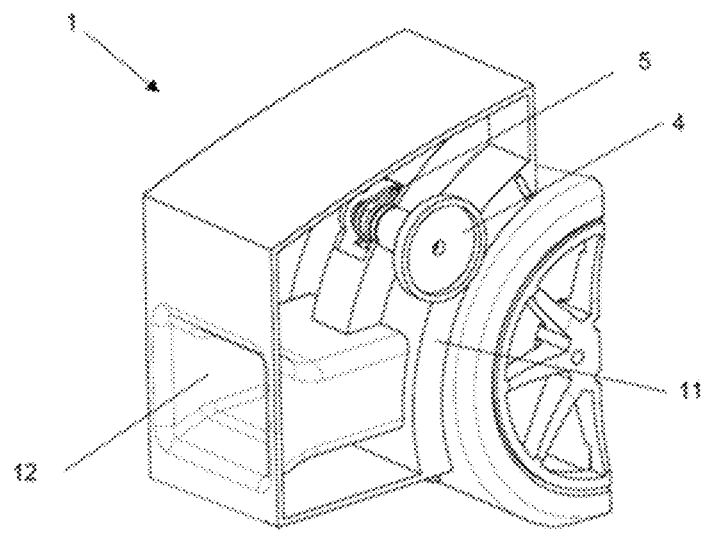
FIG. 1 shows a perspective view of an aerodynamic system according to a first embodiment arranged in a wheel housing of a vehicle, wherein the flap is in the retracted position.
Figure 2:
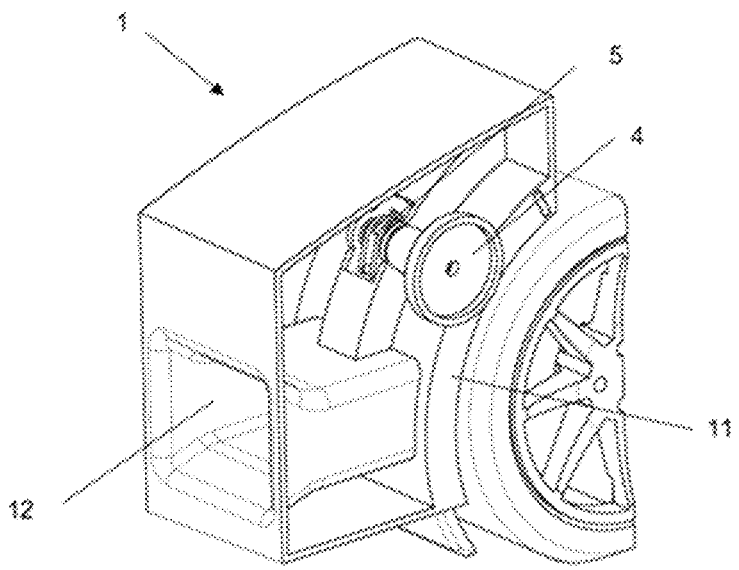
FIG. 2 shows a perspective view of the aerodynamic system of FIG. 1, wherein the flap is in the deployed position.

FIGS. 1 to 14 show a first embodiment of the aerodynamic system 1. FIGS. 1 and 2 show the first embodiment of the aerodynamic system 1 arranged in a wheel housing 11 of a vehicle.

The aerodynamic system 1 comprises a flap 2 that can be displaced between a deployed position and a retracted position, and an air flow shutter device 3 that is facing an air duct and can be displaced between a closed position and an open position. The aerodynamic system 1 also comprises an actuator 4 and a transmission mechanism 5 coupled to the actuator 4 which is configured for transmitting the movement of the actuator 4 to the flap 2 and to the shutter device 3. In other possible embodiments not shown in the drawings, the aerodynamic system may comprise more than one shutter device.

The aerodynamic system 1 is capable of controlling the movement of both the flap 2 and the shutter device 3 by means of a single actuator 4, which allows manufacturing this aerodynamic system 1 at a lower cost.

As described above, the flap 2 can be displaced between a deployed position and a retracted position. The deployed position is understood as that position in which part of the flap 2 projects from the wheel housing 11, positioned opposite the wheel and opposing the air reaching it from the front part of the vehicle, as observed in FIGS. 2, 12 and 13. This position allows the aerodynamics of the vehicle to improve and fuel consumption to drop, and therefore allowing contaminating emissions of the vehicle to also drop. It is convenient that the flap 2 is in the deployed position when the vehicle is traveling at high speeds. The retracted position is understood as that position in which the flap 2 is housed in the wheel housing 11 of the vehicle or minimally projects from the wheel housing 11, as observed in FIGS. 1, 10 and 11. It is suitable that the flap 2 is in the retracted position when the vehicle travels at low speeds or over terrains with obstacles.

As described above, the shutter device 3 can be displaced between a closed position, in which the passage of air to the wheel through the air duct is not allowed, and an open position, in which the passage of air to the wheel is allowed. The shutter device 3 thereby controls the passage of air from an air duct 12 of the vehicle to the wheel depending on the cooling needs of the brake device of the vehicle. Air can enter the air duct 12 from the front, side or lower part of the vehicle. The shutter device 3 thus allows reducing fuel consumption of the vehicle by optimizing its aerodynamics, because when the cooling needs of the brake device so allow it, i.e., when the brake does not require an air flow for cooling, it closes off the passage of air. In contrast, when the brake device requires air for cooling, the shutter device 3 allows the passage of air, obtaining proper cooling of the brake device.

Figure 11:
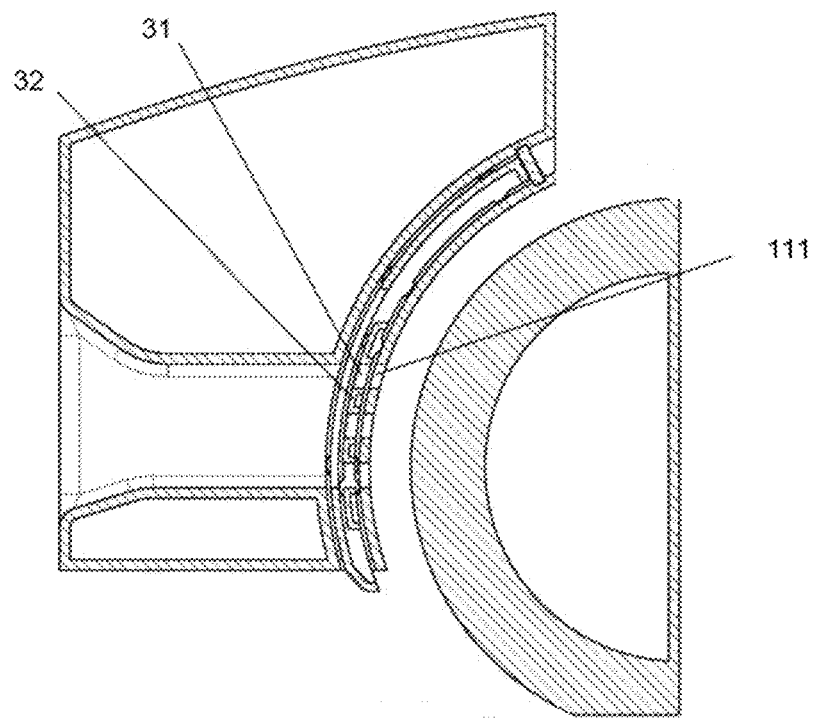
FIG. 11 shows a side view of the aerodynamic system of FIG. 1, in a second stable position.
Figure 12:
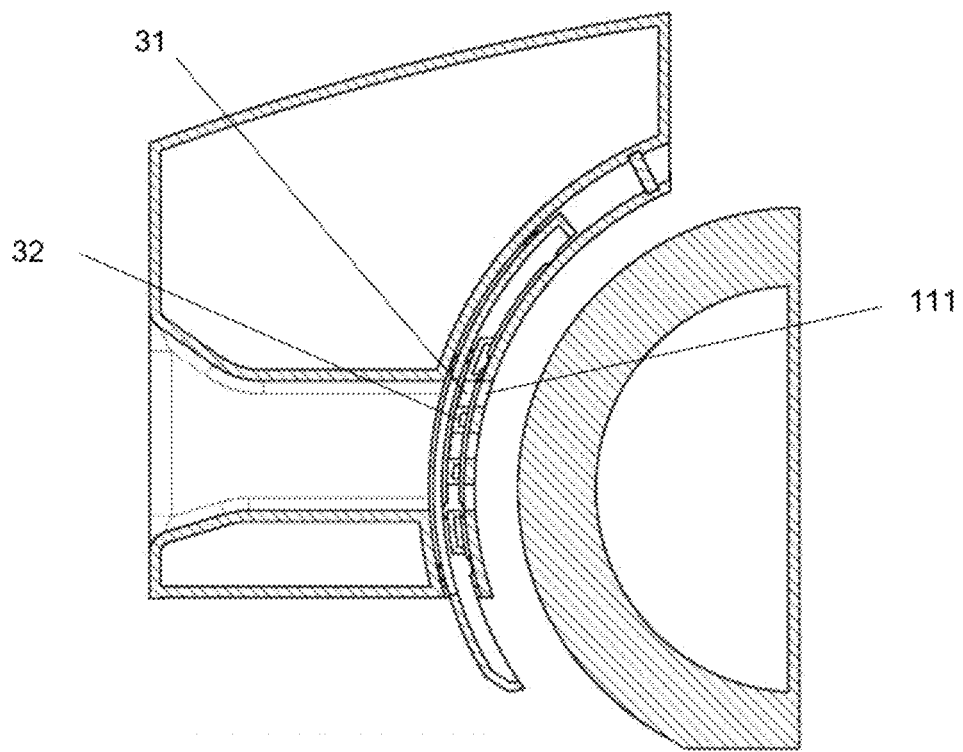
FIG. 12 shows a side view of the aerodynamic system of FIG. 1, in a third stable position.

The shutter device 3 of this first embodiment comprises a plurality of openings 31 and a plurality of closing surfaces 32. The wheel housing 11 in which the aerodynamic system 1 is arranged comprises a plurality of openings 111 located opposite the wheel of the vehicle and facing the air duct. In the closed position of the shutter device 3, the closing surfaces 32 of the shutter device 3 are arranged facing the openings 111 of the wheel housing 11, as observed in FIGS. 10 and 13. As discussed above, this closed position allows improving the aerodynamics of the vehicle. In the open position, the openings 31 of the shutter device 3 are arranged facing the openings 111 of the wheel housing 11 of the vehicle, as shown in FIGS. 11 and 12. As discussed above, this open position allows the air reaching the aerodynamic system 1 from the air duct 12 to traverse the wheel housing 11 through the shutter device 3, reaching the wheel, and allowing the cooling of the brake device located in the wheel.

In other embodiments not shown in the drawings, the implementation of the shutter device can be done in any other way known by the person skilled in the art, where the shutter devices can be of the type with pivotable slats or a roller blind-type, for example.

According to one embodiment the transmission mechanism 5 comprises in a preferred embodiment at least a first transmission surface transmitting the movement of the actuator 4 to at least one transmission surface of the flap 2 when the surfaces are coupled to one another, and at least a first blocking surface blocking the flap 2 when it cooperates with at least one blocking surface of the flap 2. The transmission mechanism 5 also comprises at least a second transmission surface transmitting the movement of the actuator 4 to at least one transmission surface of the shutter device 3 when the surfaces are coupled to one another, and at least a second blocking surface blocking the shutter device 3 when it cooperates with at least one blocking surface of the shutter device 3.

Figure 7:
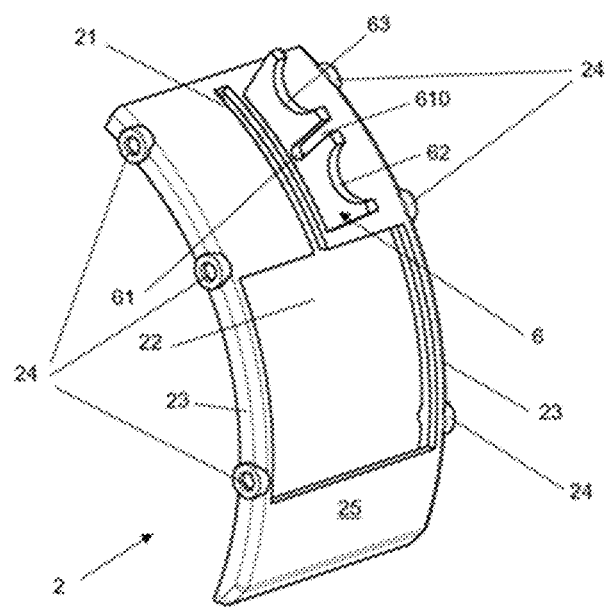
FIG. 7 shows a perspective view of the flap of the aerodynamic system of FIG. 1.

In the first embodiment, the transmission mechanism 5 comprises a first transmission surface 911 and a first blocking surface 912. The flap 2 in turn comprises a transmission surface 61 and two blocking surfaces 62 and 63. The surfaces 61, 62 and 63 are arranged in a driven element 6 comprised in the flap 2 and extending perpendicularly from a front surface 25 of the flap 2, as shown in FIG. 7.

The first transmission surface 911 of the transmission mechanism 5 transmits the movement of the actuator 4 to the transmission surface 61 of the flap 2 when the surfaces are coupled to one another, and the first blocking surface 912 of the transmission mechanism 5 blocks the flap 2 when it cooperates with one of the blocking surfaces 62 or 63 of the first driven element 6 of the flap 2.

Figure 8:
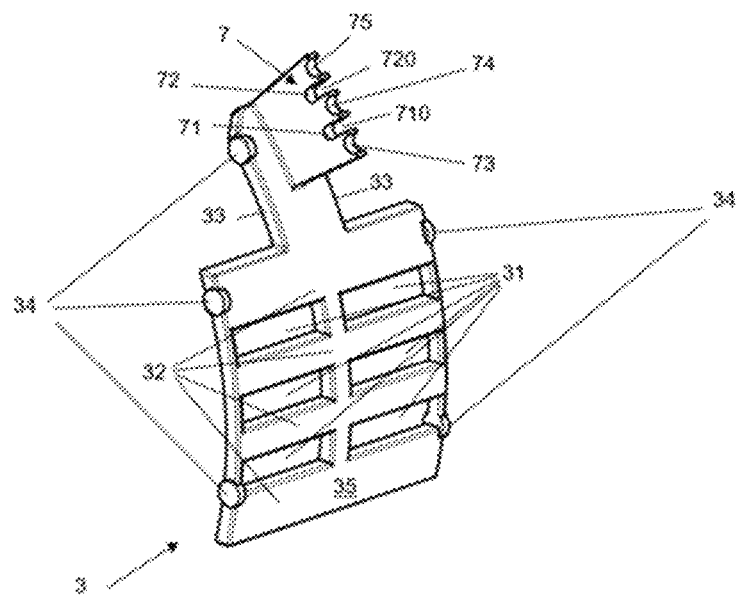
FIG. 8 shows a perspective view of the shutter device of the aerodynamic system of FIG. 1.

In this first embodiment, the transmission mechanism 5 also comprises a second transmission surface 921 and a second blocking surface 922. The shutter device 3 in turn comprises two transmission surfaces 71 and 72, and three blocking surfaces 73, 74 and 75. The surfaces 71 to 75 are arranged in a driven element 7 comprised in the shutter device 3 and extending perpendicularly from a front surface 35 of the shutter device 3, as shown in FIG. 8.

The second transmission surface 921 transmits the movement of the actuator 4 to the transmission surfaces 71 and 72 of the shutter device 3 when the surfaces are coupled to one another, and the second blocking surface 922 blocks the shutter device 3 when it cooperates with the blocking surfaces 73, 74 and 75 of the shutter device 3.

According to one embodiment, when the first transmission surface 911 is coupled to the transmission surface 61 of the flap 2, the second blocking surface 922 cooperates with a blocking surface of the shutter device 3, the flap transitioning from one position to another and the shutter device being kept immobile. Preferably, when the second blocking surface 922 cooperates with a blocking surface of the shutter device 3, the second blocking surface 922 is displaced supported on the blocking surface of the shutter device, the shutter device being kept immobile.

According to one embodiment, when the second transmission surface 921 is coupled to the transmission surface of the shutter device 3, the first blocking surface 912 cooperates with the blocking surface of the flap 2, the shutter device transitioning from one position to another and the flap being kept immobile. Preferably, when the first blocking surface 912 cooperates with the blocking surface of the flap, the first blocking surface 912 is displaced supported on the blocking surface of the flap, the flap being kept immobile.

In this first embodiment, when the first transmission surface 911 of the transmission mechanism 5 is coupled to the transmission surface 61 of the driven element 6 of the flap 2, the second blocking surface 922 cooperates with one of the blocking surfaces 73, 74 or 75 of the driven element 7 of the shutter device 3, the flap 2 transitioning from one position to another and the shutter device 3 being kept immobile. When the second blocking surface 922 cooperates with one of the blocking surfaces 73, 74 or 75 of the driven element 7 of the shutter device 3, the second blocking surface 922 is displaced supported on one of the blocking surfaces 73, 74 or 75 of the driven element 7 of the shutter device 3, the shutter device 3 being kept immobile.

Likewise, when the second transmission surface 921 of the transmission mechanism 5 is coupled to one of the transmission surfaces 71 or 72 of the driven element 7 of the shutter device 3, the first blocking surface 912 cooperates with one of the blocking surfaces 62 or 63 of the first driven element 6 of the flap 2, the shutter device 3 transitioning from one position to another and the flap 2 being kept immobile. When the first blocking surface 912 of the driving element 8 cooperates with one of the blocking surfaces 62 or 63 of the first driven element 6 of the flap 2, the first blocking surface 912 is displaced supported on one of the blocking surfaces 62 or 63 of the driven element 6 of the flap 2, the flap 2 being kept immobile.

In the first embodiment, the first blocking surface 912 and the second blocking surface 922 of the transmission mechanism 5 are convex surfaces, and the blocking surfaces 62 and 63 of the driven element 6 of the flap 2 and the blocking surfaces 73, 74 and 75 of the driven element 7 of the shutter device 3 are concave surfaces complementary to the first blocking surface 912 and second blocking surface 922, respectively.

According to one embodiment, the transmission of movement between transmission surfaces is carried out by means of the cooperation of at least one projection of one of the surfaces with at least one housing of the other surface.

In the first embodiment, the first transmission surface 911 of the transmission mechanism 5 comprises a first projection 9110. Furthermore, the transmission surface 61 of the driven element 6 of the flap 2 comprises a transmission housing 610. The transmission of movement between the transmission mechanism 5 and the flap 2 is therefore carried out by means of the cooperation of the first projection 9110 of the transmission surface 911 of the transmission mechanism 5 and the transmission housing 610 of the transmission surface 61 of the driven element 6 of the flap 2.

Furthermore, in the first embodiment the second transmission surface 921 of the transmission mechanism 5 comprises a second projection 9210. Furthermore, the transmission surfaces 71 and 72 of the driven element 7 of the shutter device 3 comprise two respective transmission housings 710 and 720. The transmission of movement between the transmission mechanism 5 and the shutter device 3 is therefore carried out by means of the cooperation of the second projection 9210 of the second transmission surface 921 of the transmission mechanism 5 and one of the transmission housings 710 or 720 of the transmission surface 71 or 72 of the driven element 7 of the shutter device 3.

FIG. 7 shows the flap 2 of this first embodiment in detail. As observed in this FIG. 7, the flap 2 has a curved shape so as to enable being housed inside the corresponding wheel housing 11, which also has a curved shape concentric to that of the surface of the wheel.

As discussed above, the flap 2 comprises the driven element 6 the transmission housing 610 of which is arranged between the two blocking surfaces 62 and 63 of the driven element 6, as shown in FIG. 7.

In this first embodiment, the flap 2 further comprises a slot 21 located parallel to the driven element 6 of the flap 2. The flap 2 further comprises a hollow space 22, contiguous to the slot 21, configured for coinciding with the plurality of openings 31 and closing surfaces 32 comprised in the shutter device 3.

In this first embodiment, the flap 2 comprises two side walls 23 in which first guiding means 24 guiding the flap 2 in its displacement between the retracted position of the flap 2 and the deployed position thereof in the wheel housing 11 of the vehicle are arranged. In this first embodiment, the guiding means 24 are wheels configured to enable being displaced along guides arranged in the wheel housing 11 of the vehicle.

FIG. 8 shows the shutter device 3 of this first embodiment in detail. As observed in FIG. 8, the shutter device 3 has a curved shape so as to enable being housed inside the corresponding wheel housing 11, which also has a curved shape concentric to that of the surface of the wheel.

As discussed above, the shutter device 3 comprises the driven element 7 the transmission housings 710 and 720 of which are arranged in an alternating manner between the blocking surfaces 73, 74 and 75 of the driven element 7, as shown in FIG. 8.

In this first embodiment, and as observed in FIG. 8, the shutter device 3 has two side walls 33 located on both sides of the driven element 7 and of the plurality of openings 31 and closing surfaces 32 comprised in the shutter device 3. The side walls 33 of the shutter device 3 have second guiding means 34 guiding the shutter device 3 in its displacement between the closed position of the shutter device 3 and the open position thereof. In this first embodiment, the guiding means 34 are wheels configured to enable being displaced along guides arranged in the flap 2 of the vehicle.

Figure 3:
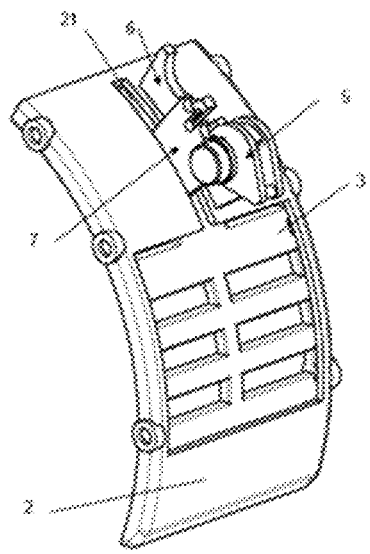
FIG. 3 shows a perspective view of the aerodynamic system of FIG. 1 outside of the wheel housing and without the actuator, in a first stable position.

In this first embodiment, and as shown in FIG. 3, the driven element 7 of the shutter device 3 is housed in the slot 21 of the flap 2 such that it can be displaced along the slot 21. Once the flap 2 and shutter device 3 are fitted together, the shutter device 3 is positioned in the rear part of the flap 2, as can be seen in FIG. 3. However, this relative arrangement between the flap and the shutter device is not intended to be a limitation of the present invention, and in other embodiments the relative arrangement between flap and shutter device could be another arrangement.

Likewise, the guiding means used in this first embodiment are not intended to be a limitation of the present invention, and in other embodiments the guiding means could be guiding means of another type and be arranged in another manner.

In this first embodiment, the actuator 4 and the transmission mechanism 5 are axially coupled to one another, as shown in FIG. 1.

Figure 9:
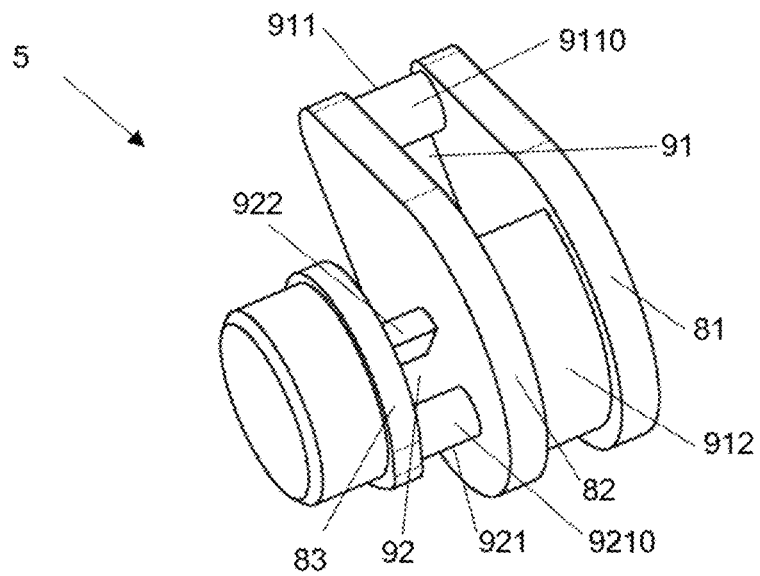
FIG. 9 shows a perspective view of the transmission mechanism of the aerodynamic system of FIG. 1.

FIG. 9 shows the transmission mechanism 5 of the first embodiment in detail. The transmission mechanism 5 comprises a first side area 81, a first central area 91, a second side area 82, a second central area 92 and a third side area 83.

In this first embodiment, the first central area 91 comprises the first projection 9110 of the first transmission surface 911. The first projection 9110 is arranged transverse to the first side area 81 and to the second side area 82. As discussed above, the first projection 9110 is configured for cooperating with the transmission housing 610 of the driven element 6 of the flap 2 and being displaced along the path of the transmission housing 610. During the displacement, the first transmission surface 911 of the first projection 9110 is coupled to the transmission housing 610 of the transmission surface 61, transmitting the movement of the actuator 4 to the transmission surface 61 of the flap 2, causing the flap 2 to be displaced.

In this first embodiment, the first central area 91 of the transmission mechanism 5 also comprises the first convex-shaped blocking surface 912 extending perpendicularly between the first side area 81 and the second side area 82, and configured for being supported on the blocking surfaces 62 and 63 of the driven element 6 of the flap 2. As discussed above, the first blocking surface 912 of the transmission mechanism 5 and the blocking surfaces 62 and 63 of the driven element 6 of the flap 2 are complementary to one another, such that when the actuator 4 transmits its rotational movement to the transmission mechanism 5, when the first blocking surface 912 of the transmission mechanism 5 is still facing one of the blocking surfaces 62 or 63 of the driven element 6 of the flap 2, they will both cooperate with one another, the first blocking surface 912 being displaced in its rotational movement over one of the blocking surface 62 or 63 of the driven element 6 of the flap 2, which is still blocked, causing the flap 2 to remain immobile.

In this first embodiment, the second central area 92 of the transmission mechanism 5 comprises the second projection 9210 the surface of which is the second transmission surface 921. The second projection 9210 is arranged transverse to the second side area 82 and third side area 83. As discussed above, the second projection 9210 is configured for cooperating with one of the transmission housings 710 or 720 of the second driven element 7 of the shutter device 3 and being displaced along the path of the transmission housing 710 or 720. During the displacement, the second projection 9210 of the second transmission surface 921 is coupled to one of the transmission housings 710 or 720 of the transmission surface 71 or 72 of the driven element 7 of the shutter device 3, transmitting the movement of the actuator 4 to the transmission surface 71 or 72 of the shutter device 3, causing the shutter device 3 to be displaced.

In this first embodiment, the second central area 92 of the transmission mechanism 5 also comprises the second convex-shaped blocking surface 922 extending perpendicularly between the second side area 82 and the third side area 83, and configured for being supported on the blocking surfaces 73, 74 and 75 of the driven element 7 of the shutter device 3. As discussed above, the second blocking surface 922 of the transmission mechanism 5 and the blocking surfaces 73, 74 and 75 of the driven element 7 of the shutter device 3 are complementary to one another, such that when the actuator 4 transmits its rotational movement to the transmission mechanism 5, when the second blocking surface 922 is still facing one of the blocking surfaces 73, 74 or 75 of the driven element 7 of the shutter device 3, they will both cooperate with one another, the second blocking surface 922 being displaced in its rotational movement over the blocking surface 73, 74 or 75, which is still blocked, causing the shutter device 3 to remain immobile.

Figure 14:
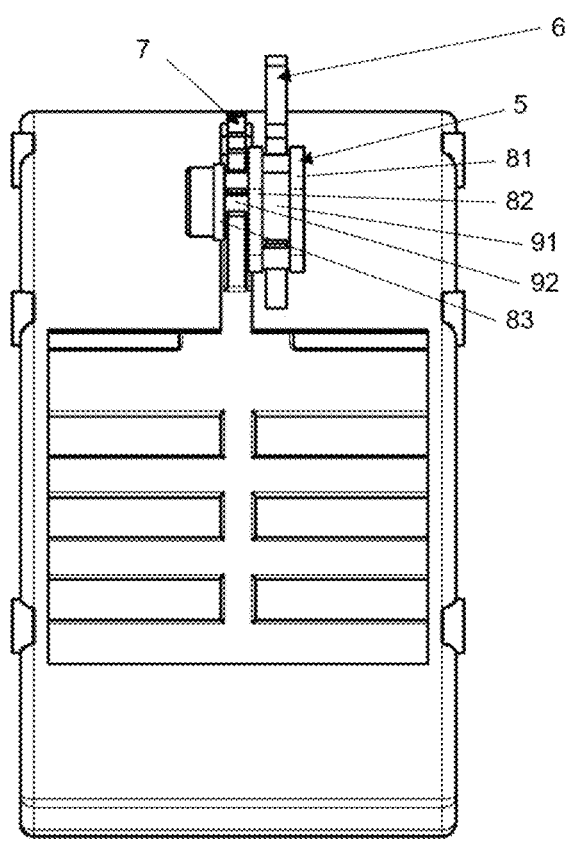
FIG. 14 shows a front view of the aerodynamic system of FIG. 1.
Figure 15:
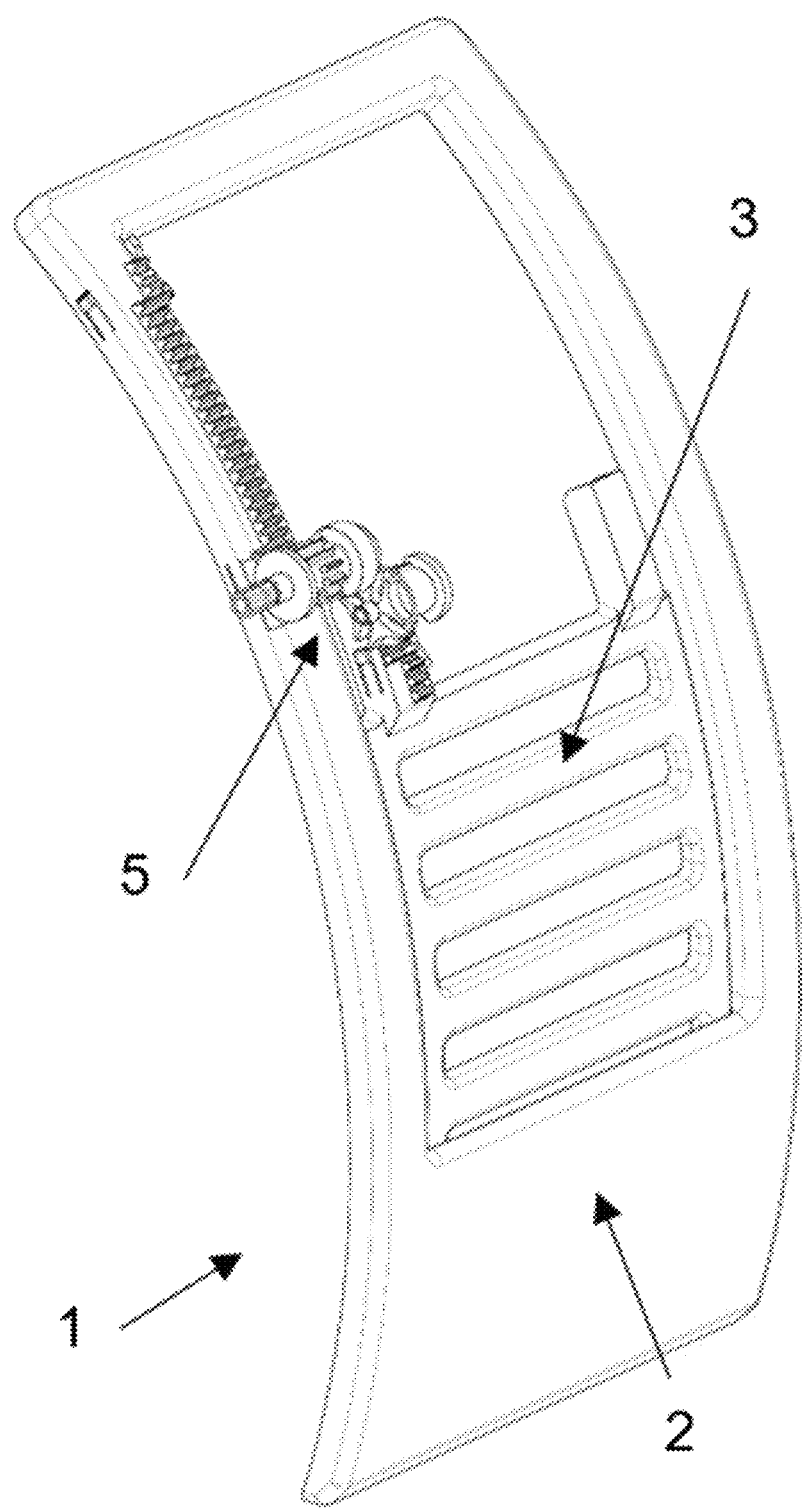
FIG. 15 shows a perspective view of an aerodynamic system according to a second embodiment without the actuator.

According to one embodiment, the width of the first central area 91 is equal to the width of the driven element 6 of the flap 2 and the width of the second central area 92 is equal to the width of the driven element 7 of the shutter device 3. In the same manner, in this first embodiment, the width of the second side area 82 is equal to the distance separating the driven elements 6 and 7 when the flap 2 and the shutter device 3 are fitted together, as shown in FIG. 14, allowing the side area 82 to fit and be able to rotate in the hollow space that is left between both driven elements 6 and 7, which are arranged parallel to one another.

In this first embodiment, the actuator 4 is connected to the first side area 81 of the transmission mechanism 5, as shown in FIG. 1. However, in another embodiment, the actuator 4 could be connected to the third side area 83.

In this first embodiment, the aerodynamic system 1 of the invention has four stable positions. The control of the vehicle will order the actuator 4 to perform the movements required to transition from one stable position to another stable position.

Figure 10:
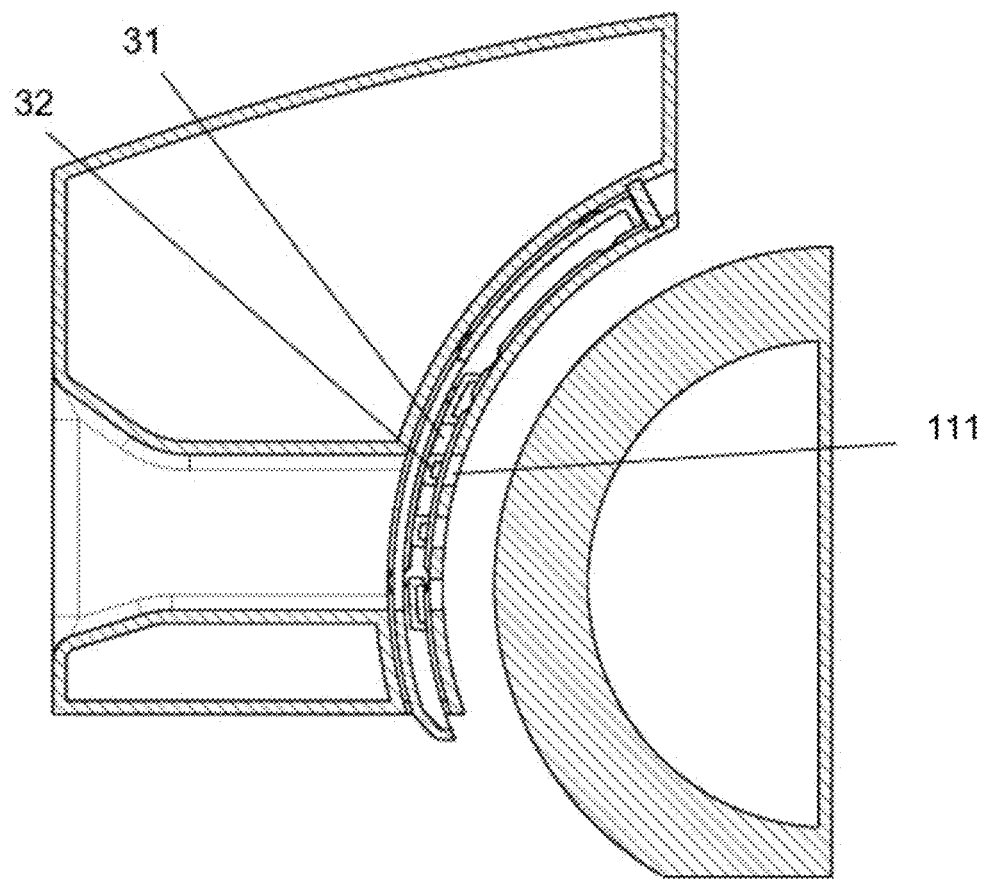
FIG. 10 shows a side view of the aerodynamic system of FIG. 1, in a first stable position.

The first stable position of this first embodiment can be observed in FIGS. 3 and 10. In this first stable position, the shutter device 3 is in the closed position and the flap 2 is in the retracted position. In this first stable position, the first blocking surface 912 of the transmission mechanism 5 is supported on the blocking surface 62 of the driven element 6 of the flap 2. However, in this first stable position, the first transmission surface 911 does not cooperate with any other surface, i.e., it is free. In this first stable position, the second transmission surface 921 of the transmission mechanism 5 is arranged in the upper part of the first transmission housing 710, and the second blocking surface 922 is supported on the blocking surface 73 of the driven element 7 of the shutter device 3.

Starting from this first stable position of this first embodiment, if the actuator 4 starts to rotate in the counter-clockwise direction as a result of the order sent by the control of the vehicle, the first blocking surface 912 of the transmission mechanism 5 will rotate supported on the blocking surface 62 of the driven element 6 of the flap 2, both surfaces collaborating with one another, such that the driven element 6 of the flap 2 will be blocked, and therefore the flap 2 will still be immobile, i.e., the flap 2 will remain in the retracted position. However, the first transmission surface 911 will also rotate as a result of the rotational movement transmitted by the actuator 4, until being arranged in the upper part of the transmission housing 610.

In the rotational movement transmitted by the actuator 4 to the transmission mechanism 5, the second blocking surface 922 of the transmission mechanism 5 will no longer be facing the blocking surface 73 of the driven element 7 of the shutter device 3, such that both blocking surfaces 922 and 73 will not collaborate with one another. Furthermore, the second transmission surface 921 of the transmission mechanism 5 will enter the first transmission housing 710 of the driven element 7 of the shutter device 3, such that the second transmission surface 921 will collaborate with the transmission surface 71 of the driven element 7 of the shutter device 3, pulling the shutter device 3, and therefore converting the rotational movement of the actuator 4, and therefore of the transmission mechanism 5, into a movement of linear displacement of the shutter device 3. The second transmission surface 921 of the transmission mechanism 5 will enter the first transmission housing 710 until the axis of rotation of the transmission mechanism 5 is aligned with the path of the first transmission housing 710. At that precise time, the actuator 4 will continue rotating, and the second transmission surface 921 of the transmission mechanism 5 will start to come out of the first transmission housing 710 of the driven element 7 of the shutter device 3, such that the second transmission surface 921 will collaborate with the transmission surface 71 of the driven element 7 of the shutter device 3, pulling the shutter device 3 until the second transmission surface 921 is arranged in the upper part of the first transmission housing 710, at which time the shutter device 3 will be in an open position. During this movement of displacement of the shutter device 3, the shutter device 3 will have transitioned from a closed position to an open position, the aerodynamic system 1 reaching its second stable position.

In this first embodiment, in the transition from the first stable position to the second stable position, the flap 2 is still immobile because during the transition, the first blocking surface 912 of the transmission mechanism 5 collaborates with the blocking surface 62 of the driven element 6 of the flap 2. During this transition, the shutter device 3 transitions from a closed position to an open position because the second transmission surface 921 of the transmission mechanism 5 transmits the movement of the actuator 4 to the transmission surface 71 of the shutter device 3 when the transmission surfaces 921 and 71 are coupled to and cooperate with one another.

In this first embodiment, to transition from the second stable position to the first stable position, the process described above would be carried out in the reverse order, as the actuator 4 rotates in the clockwise direction.

Figure 4:
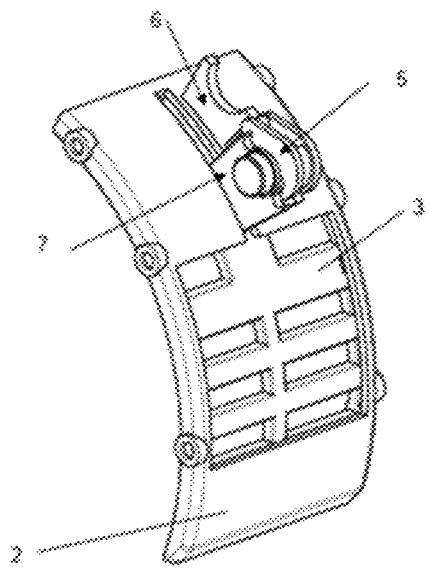
FIG. 4 shows a perspective view of the aerodynamic system of FIG. 1 outside of the wheel housing and without the actuator, in a second stable position.

The second stable position of this first embodiment can be observed in FIGS. 4 and 11. In this second stable position, the shutter device 3 is in the open position and the flap 2 is in the retracted position.

Starting from this second stable position of this first embodiment, if the actuator 4 starts to rotate or continues to rotate in the counter-clockwise direction as a result of the order sent by the control of the vehicle, the first blocking surface 912 of the transmission mechanism 5 will no longer be facing the blocking surface 62 of the driven element 6 of the flap 2, such that both blocking surfaces 912 and 62 will not collaborate with one another. On the other hand, the first transmission surface 911 of the transmission mechanism 5 will enter the transmission housing 610 of the driven element 6 of the flap 2, such that the first transmission surface 911 will collaborate with the transmission surface 61 of the driven element 6 of the flap 2, pulling the flap 2, and therefore converting the rotational movement of the actuator 4, and therefore of the transmission mechanism 5, into a movement of linear displacement of the flap 2. The first transmission surface 911 of the transmission mechanism 5 will enter the transmission housing 610 of the driven element 6 of the flap 2 until the axis of rotation of the transmission mechanism 5 is aligned with the path of the transmission housing 610 of the transmission mechanism 5. At that precise time, the actuator 4 will continue rotating, and the first transmission surface 911 of the transmission mechanism 5 will start to come out of the transmission housing 610 of the driven element 6 of the flap 2, such that the first transmission surface 911 will collaborate with the transmission surface 61 of the driven element 6 of the flap 2, pulling the flap 2 until the first transmission surface 911 is arranged in the upper part of the transmission housing 610, at which time the flap 2 will transition to a deployed position. During this movement of displacement of the flap 2, the flap 2 will have transitioned from a retracted position to a deployed position.

On the other hand, in the rotational movement transmitted by the actuator 4 to the transmission mechanism 5, the second blocking surface 922 of the transmission mechanism 5 will rotate supported on the blocking surface 74 of the driven element 7 of the shutter device 3, both surfaces collaborating with one another, such that the driven element 7 of the shutter device 3 will be blocked, and therefore the shutter device 3 will still be immobile, i.e., the shutter device 3 will remain in the open position.

However, the second transmission surface 921 of the transmission mechanism 5 will also rotate as a result of the rotational movement transmitted by the actuator 4 until being arranged in the upper part of the second transmission housing 720 of the driven element 7 of the shutter device 3.

At this precise time, the aerodynamic system 1 is in its third stable position. In this first embodiment, in this transition from the second stable position to the third stable position, the shutter device 3 is still immobile because during the transition, the second blocking surface 922 of the transmission mechanism 5 collaborates with the blocking surface 74 of the driven element 7 of the shutter device 3. During this transition, the flap 2 transitions from a retracted position to a deployed position because the first transmission surface 911 of the transmission mechanism 5 transmits the movement of the actuator 4 to the transmission surface 61 of the flap 2 when the transmission surfaces 911 and 61 are coupled to and cooperate with one another.

In this first embodiment, to transition from the third stable position to the second stable position, the process described above would be carried out in the reverse order, as the actuator 4 rotates in the clockwise direction.

Figure 5:
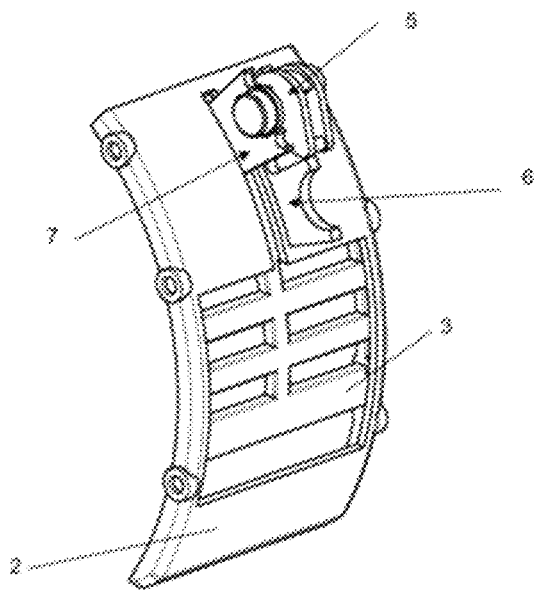
FIG. 5 shows a perspective view of the aerodynamic system of FIG. 1 outside of the wheel housing and without the actuator, in a third stable position.

The third stable position of this first embodiment can be observed in FIGS. 5 and 12. In this third stable position, the shutter device 3 is in the open position and the flap 2 is in the deployed position.

Starting from this third stable position of this first embodiment, if the actuator 4 starts to rotate or continues to rotate in the counter-clockwise direction as a result of the order sent by the control of the vehicle, the first blocking surface 912 of the transmission mechanism 5 will rotate supported on the blocking surface 63 of the driven element 6 of the flap 2, both surfaces collaborating with one another, such that the driven element 6 of the flap 2 will be blocked, and therefore the flap 2 will still be immobile, i.e., the flap 2 will remain in the deployed position. However, the first transmission surface 911 of the transmission mechanism 5 will also rotate as a result of the rotational movement transmitted by the actuator 4, the transmission surface 911 being free, such that it does not cooperate with any other transmission surface.

In the rotational movement transmitted by the actuator 4 to the transmission mechanism 5 the second blocking surface 922 of the transmission mechanism 5 will no longer be facing the blocking surface 74 of the driven element 7 of the shutter device 3, such that both blocking surfaces 922 and 74 will not collaborate with one another. On the other hand, the second transmission surface 921 of the transmission mechanism 5 will enter the second transmission housing 720 of the driven element 7 of the shutter device 3, such that the second transmission surface 921 will collaborate with the transmission surface 72 of the driven element 7 of the shutter device 3, pulling the shutter device 3, and therefore converting the rotational movement of the actuator 4, and therefore of the transmission mechanism 5, into a movement of linear displacement of the shutter device 3. The second transmission surface 921 of the transmission mechanism 5 will enter the second transmission housing 720 until the axis of rotation of the transmission mechanism 5 is aligned with the path of the second transmission housing 720. At that precise time, the actuator 4 will continue rotating, and the second transmission surface 921 of the transmission mechanism 5 will start to come out of the second transmission housing 720 of the driven element 7 of the shutter device 3, such that the second transmission surface 921 will collaborate with the transmission surface 72 of the driven element 7 of the shutter device 3, pulling the shutter device 3 until the second transmission surface 921 is arranged in the upper part of the second transmission housing 720 of the driven element 7 of the shutter device 3, at which time the shutter device 3 will transition to a closed position. During this movement of displacement of the shutter device 3, the shutter device 3 will have transitioned from an open position to a closed position.

At this precise time, the aerodynamic system 1 is in its fourth stable position. In this first embodiment, in this transition from the third stable position to the fourth stable position, the flap 2 is still immobile because during the transition, the first blocking surface 912 of the transmission mechanism 5 collaborates with the blocking surface 63 of the driven element 6 of the flap 2. During this transition, the shutter device 3 transitions from an open position to a closed position because the second transmission surface 921 of the transmission mechanism 5 transmits the movement of the actuator 4 to the transmission surface 72 of the shutter device 3 when the transmission surfaces 921 and 72 are coupled to and cooperate with one another.

In this first embodiment, to transition from the fourth stable position to the third stable position, the process described above would be carried out in the reverse order, as the actuator 4 rotates in the clockwise direction.

Figure 6:
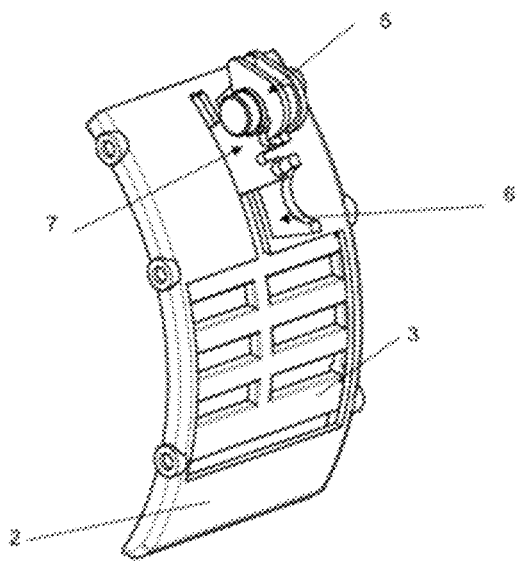
FIG. 6 shows a perspective view of the aerodynamic system of FIG. 1 outside of the wheel housing and without the actuator, in a fourth stable position.
Figure 13:
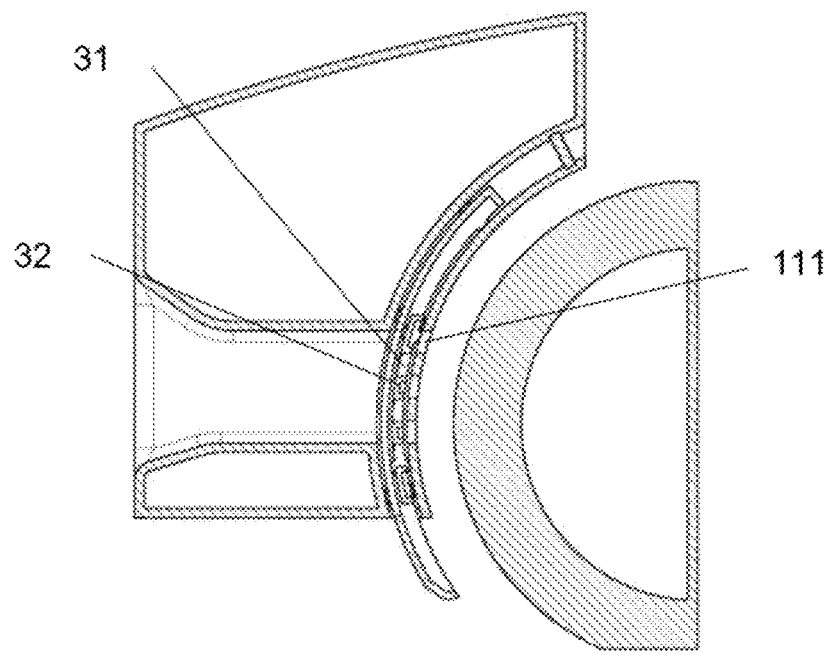
FIG. 13 shows a side view of the aerodynamic system of FIG. 1, in a fourth stable position.

The fourth stable position of this first embodiment can be observed in FIGS. 6 and 13. In this fourth stable position, the shutter device 3 is in the closed position and the flap 2 is in the deployed position.

FIGS. 15 to 26 show a second embodiment of the aerodynamic system 1 of the invention.

The second embodiment differs from the first embodiment in the transmission mechanism 5 and in the transmission and blocking surfaces of the flap 2 and of the shutter device 3. The remaining features are similar to the first embodiment, so it is considered unnecessary to describe them again.

Figure 17:
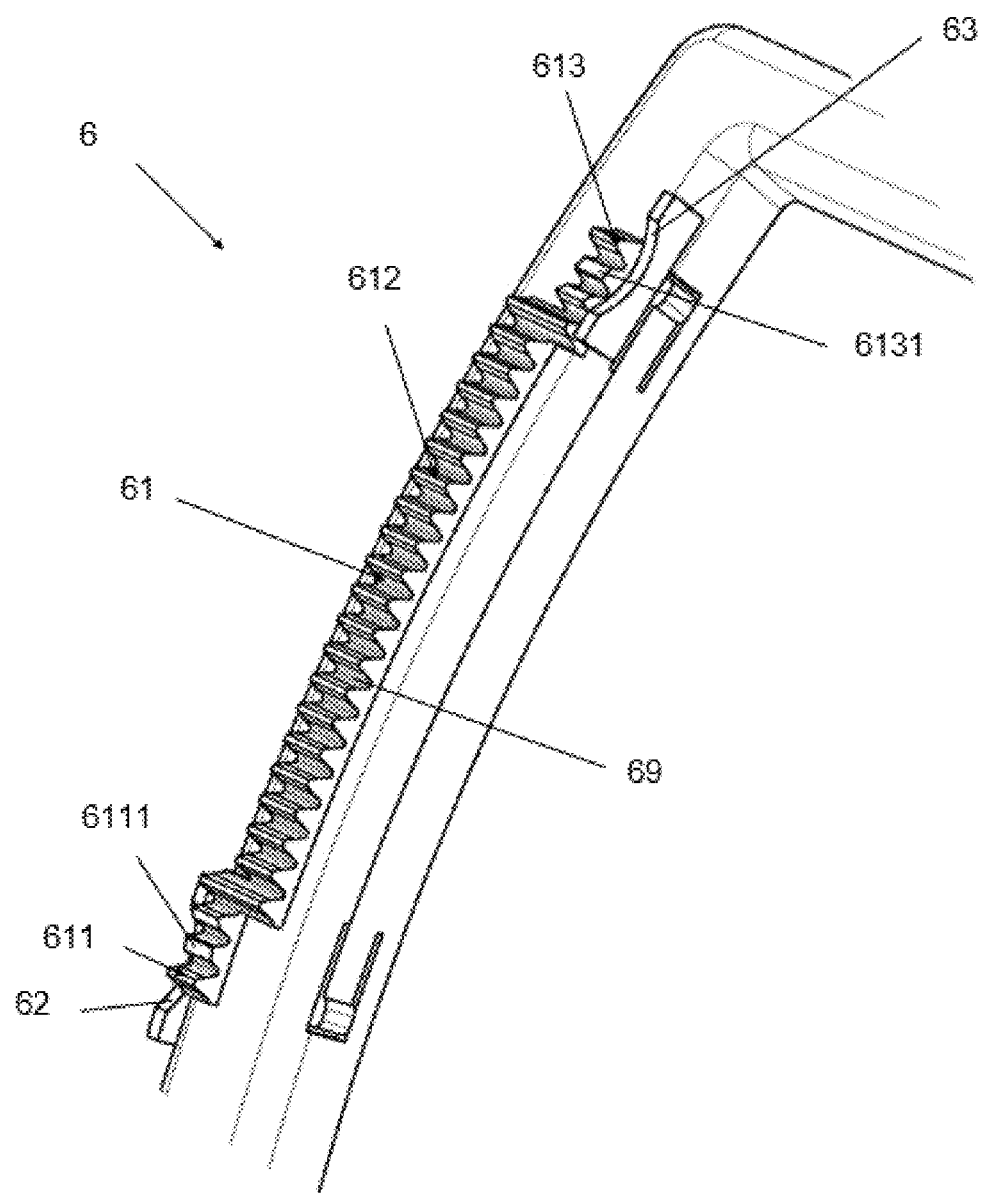
FIG. 17 shows a second perspective view of the flap of the aerodynamic system of FIG. 15.

In this second embodiment, the flap 2 also comprises a driven element 6, as shown in detail in FIG. 17. The driven element 6 comprises a transmission surface 61 and a lower blocking surface 62 and an upper blocking surface 63. The transmission surface 61 comprises a first rack 611, a second rack 612 and a third rack 613.

The transmission mechanism 5 comprises a first pinion/gear wheel 8 comprising a first transmission surface 841 and two first blocking surfaces 811 and 831. The first transmission surface 841 comprises a first gear 84, a second gear 85 and a third gear 86.

The first transmission surface 841 of the first pinion 8 transmits the movement of the actuator 4 to the transmission surface 61 of the first driven element 6 of the flap 2 when the surfaces engage one another. Furthermore, the flap 2 is blocked when one of the first blocking surfaces 811 or 831 of the first pinion 8 cooperates with the lower blocking surface 62 or the upper blocking surface 63 of the first driven element 6 of the flap 2.

Figure 18:
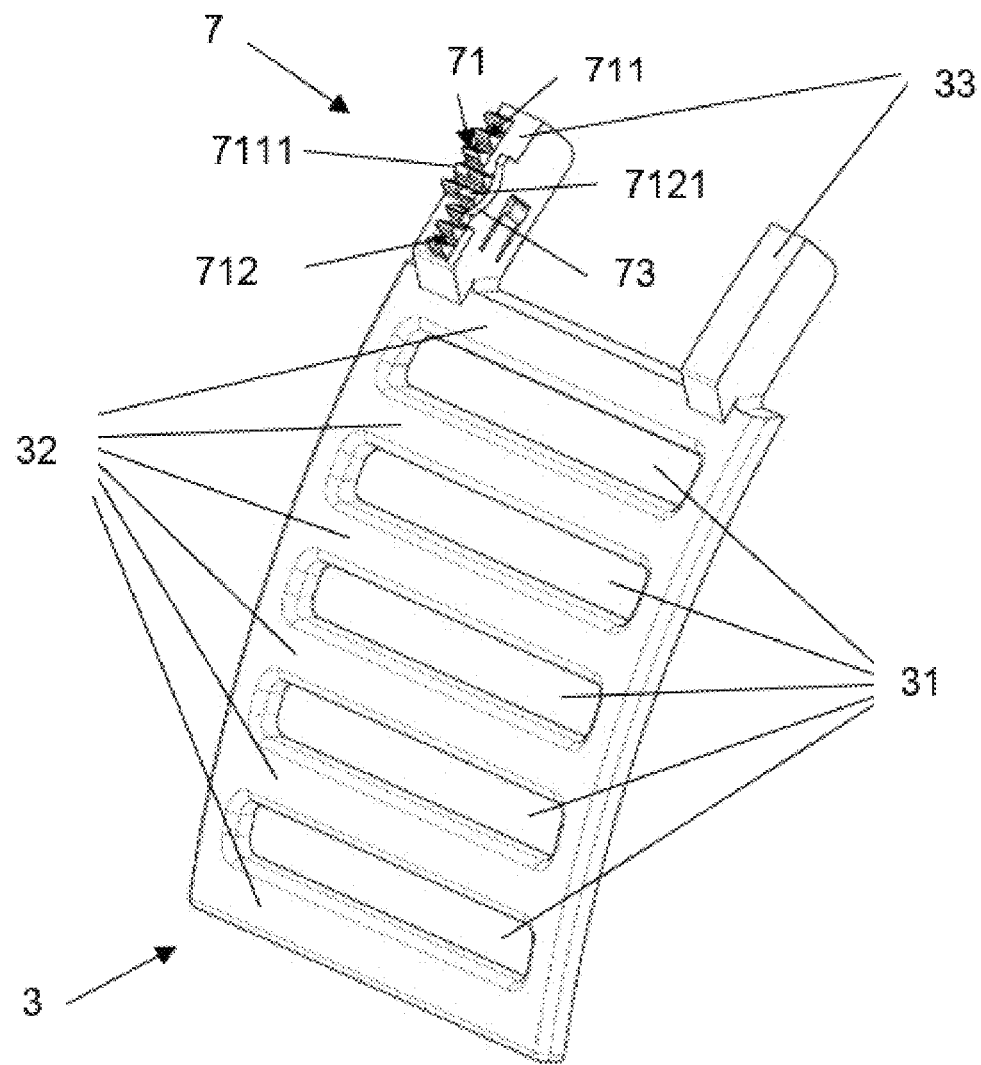
FIG. 18 shows a perspective view of the shutter device of the aerodynamic system of FIG. 15.

In this second embodiment, the shutter device 3 also comprises a driven element 7, as shown in FIG. 18. The driven element 7 comprises a transmission surface 71 and a blocking surface 73. The transmission surface 71 comprises a first rack 711 and a second rack 712.

The transmission mechanism 5 also comprises a second pinion 9 comprising a second transmission surface 931 and a second blocking surface 920. The second transmission surface 931 comprises a first gear 93 and a second gear 94.

The second transmission surface 931 of the second pinion 9 transmits the movement of the actuator 4 to the transmission surface 71 of the driven element 7 of the shutter device 3 when the surfaces engage one another. Furthermore, the shutter device 3 is blocked when the second blocking surface 920 of the second pinion 9 cooperates with the blocking surface 73 of the driven element 7 of the shutter device 3.

In this second embodiment, when the first transmission surface 841 of the first pinion 8 is coupled to the transmission surface 61 of the driven element 6 of the flap 2, the second blocking surface 920 of the second pinion 9 cooperates with the blocking surface 73 of the driven element 7 of the shutter device 3, the flap 2 transitioning from one position to another and the shutter device 3 being kept immobile. When the second blocking surface 920 of the second pinion 9 cooperates with the blocking surface 73 of the driven element 7 of the shutter device 3, the second blocking surface 920 is displaced supported on the blocking surface 73 of the driven element 7 of the shutter device 3, the shutter device 3 being kept immobile.

Likewise, when the second transmission surface 931 of the second pinion 9 is coupled to the transmission surface 71 of the driven element 7 of the shutter device 3, one of the first blocking surfaces 811 or 831 of the first pinion 8 cooperates with the lower blocking surface 62 or the upper blocking surface 63 of the driven element 6 of the flap 2, the shutter device 3 transitioning from one position to another and the flap 2 being kept immobile. When one of the first blocking surfaces 811 or 831 of the first pinion 8 cooperates with the lower blocking surface 62 or the upper blocking surface 63 of the driven element 6 of the flap 2, one of the first blocking surfaces 811 or 831 is displaced supported on the lower blocking surface 62 or the upper blocking surface 63 of the driven element 6 of the flap 2, the flap 2 being kept immobile.

According to one embodiment the first blocking surfaces 811 and 831 of the first pinion 8, and the second blocking surface 920 of the second pinion 9 are convex surfaces, and the lower blocking surface 62 or the upper blocking surface 63 of the driven element 6 of the flap 2 and the blocking surface 73 of the driven element 7 of the shutter device 3 are concave surfaces complementary to the first blocking surfaces 811 and 831 and second blocking surface 920, respectively.

In this second embodiment, the transmission surfaces therefore comprise a plurality of alternating projections and housings forming a first rack and pinion-type connection between the pinion 8 and the racks 611, 612 and 613, and a second rack and pinion-type connection between the pinion 9 and the racks 711 and 712.

Figure 27:
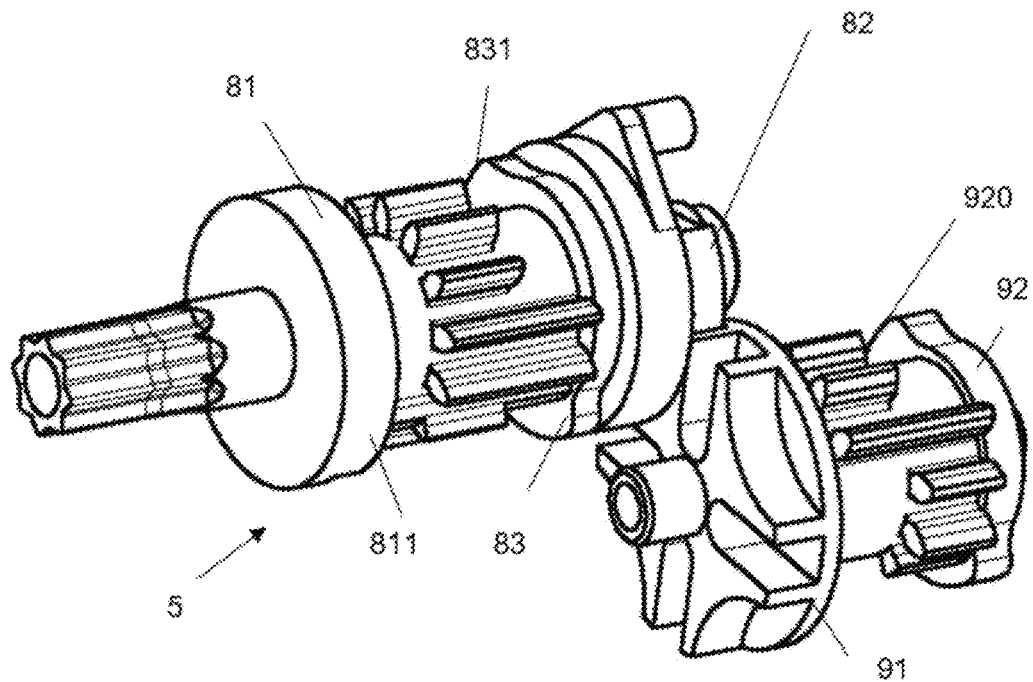
FIG. 27 shows a perspective view of the transmission mechanism of the aerodynamic system of FIG. 15.

In this second embodiment, the first pinion 8 is coupled to the actuator 4, the first pinion 8 being coupled in turn to the second pinion 9. The first pinion 8 transmits rotation to the second pinion 9 by means of a turn reduction drive mechanism. In this second embodiment, the turn reduction drive mechanism is a Geneva drive, as shown in FIG. 27. In other possible embodiments, the turn reduction drive mechanism can be of any other type known by the person skilled in the art.

Figure 16:
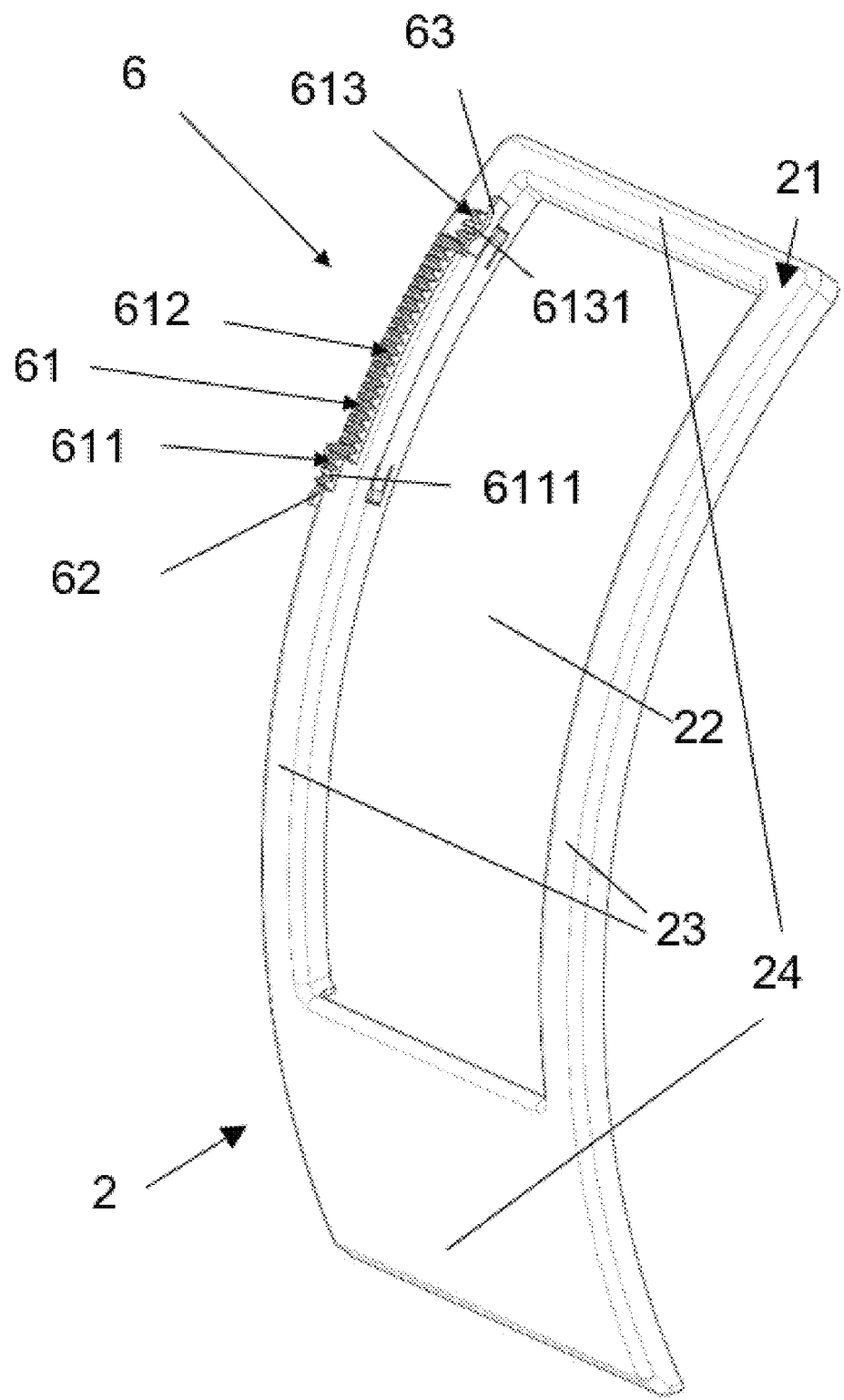
FIG. 16 shows a first perspective view of the flap of the aerodynamic system of FIG. 15.

FIG. 16 shows the flap 2 of this second embodiment in detail. The flap 2 comprises a frame 21 defining a hollow space 22 demarcated by two longitudinal walls 23 and two transverse walls 24.

In this second embodiment, the flap 2 also comprises, on one of the longitudinal walls 23, the driven element 6 comprising the first rack 611, the second rack 612 and the third rack 613. As discussed above, the first, second and third racks 611, 612 and 613 form the transmission surface 61. The driven element 6 further comprises a lower blocking surface 62 and an upper blocking surface 63. The lower and upper blocking surfaces 62 and 63 have a concave shape.

As observed in detail in FIG. 17, the first, second and third racks 611, 612 and 613 are parallel to one another. The second rack 612 is located between the first rack 611 and the third rack 613, such that part of the path of the first rack 611 and part of the path of the second rack 612 coincide, and part of the path of the second rack 612 and part of the path of the third rack 613 also coincide, as shown in FIGS. 16 and 17. The lower blocking surface 62 is located parallel to the first rack 611, and the upper blocking surface 63 is located parallel to the third rack 613.

In this second embodiment, the driven element 6 is arranged in one of the longitudinal walls; however, this arrangement is not intended to be a limitation of the present invention, and in other embodiments it could be arranged in the other longitudinal wall, or even in a central area.

FIG. 18 shows the shutter device 3 of this second embodiment in detail. The shutter device 3 has two side walls 33.

In this second embodiment, the driven element 7 of the shutter device 3 is arranged on one of the side walls 33. As discussed above, the driven element 7 comprises a first rack 711 and a second rack 712 forming the transmission surface 71 of the shutter device 3. The driven element 7 further comprises a concave-shaped blocking surface 73.

As observed in FIG. 18, the first rack 711, the second rack 712 and the blocking surface 73 are parallel to one another, and the second rack 712 is located between the first rack 711 and the blocking surface 73, such that part of the path of the rack 711 and part of the path of the rack 712 coincide.

In this second embodiment, the driven element 7 is arranged in one of the side walls; however, this arrangement is not intended to be a limitation of the present invention, and in other embodiments it could be arranged in the other side wall, or even in a central area.

Figure 19:
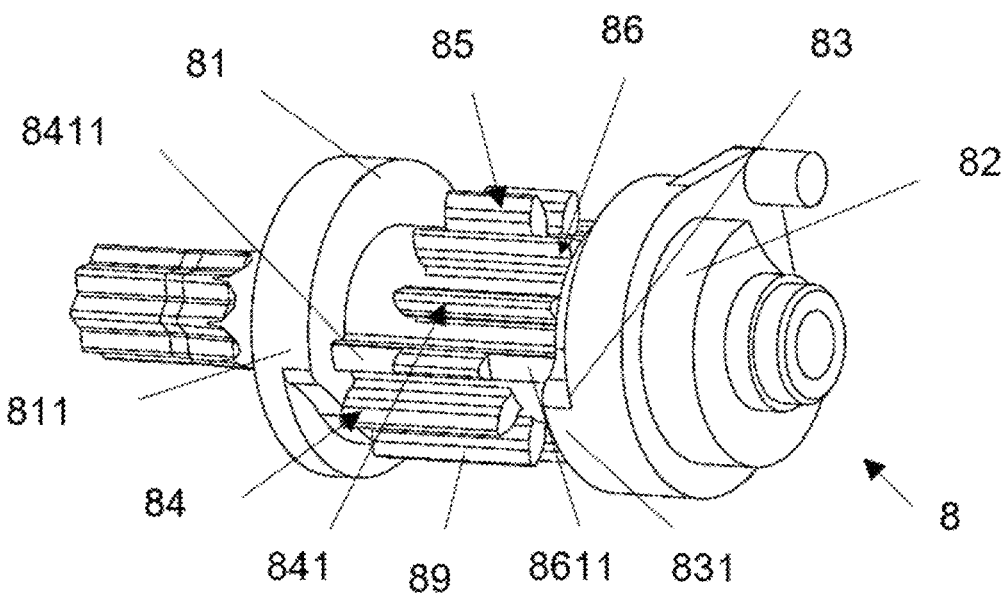
FIG. 19 shows a perspective view of the first pinion/gear wheel of the transmission mechanism of the aerodynamic system of FIG. 15.

FIG. 19 shows the detail of the first pinion 8. The pinion 8 comprises a first side area 81, a second side area 83 and a coupling area 82.

In this second embodiment, the actuator 4 is connected to the first side area 81 of the pinion 8.

In this second embodiment, as shown in FIG. 19, the first side area 81 of the pinion 8 comprises one of the first convex-shaped blocking surfaces 811, having a diameter greater than the rest of the surface of this first side area 81, not constituting a blocking surface. The first blocking surface 811 is configured for being supported on the lower blocking surface 62 of the driven element 6 of the flap 2, the first blocking surface 811 and the lower blocking surface 62 being complementary to one another.

In this second embodiment, as shown in FIG. 19, the second side area 83 of the pinion 8 comprises one of the first convex-shaped blocking surfaces 831, having a diameter greater than the rest of the surface of this second side area 83, not constituting a blocking surface. The first blocking surface 831 is configured for being supported on the upper blocking surface 63 of the driven element 6 of the flap 2, the first blocking surface 831 and the upper blocking surface 63 being complementary to one another.

As discussed above, in this second embodiment, the first pinion 8 and the second pinion 9 are coupled by means of a mechanism referred to as a Geneva drive, the coupling area 82 of the first pinion 8 being configured for cooperating with the Geneva drive of the second pinion 9. This mechanism allows each complete rotation of the first pinion 8 to be converted into a 90° rotation of the second pinion 9.

In this second embodiment, and as shown in FIG. 19, the first pinion 8 further comprises between the first side area 81 and the second side area 83 the first gear 84, the second gear 85 and the third gear 86, configured for engaging the first, second and third racks 611, 612 and 613 of the flap 2, respectively.

Figure 23:
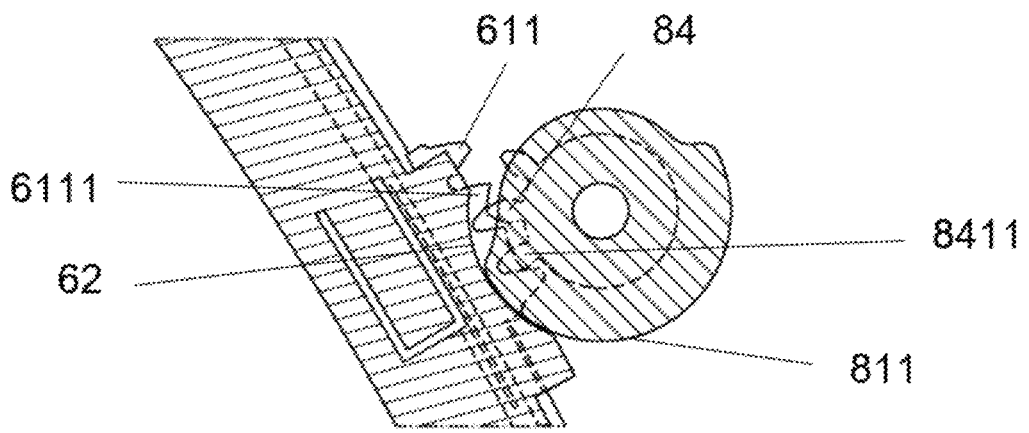
FIG. 23 shows a detailed view of the first pinion/gear wheel of the transmission mechanism and of the flap of the aerodynamic system of FIG. 15, the first transmission surface being ready to engage the transmission surface of the flap.
Figure 24:
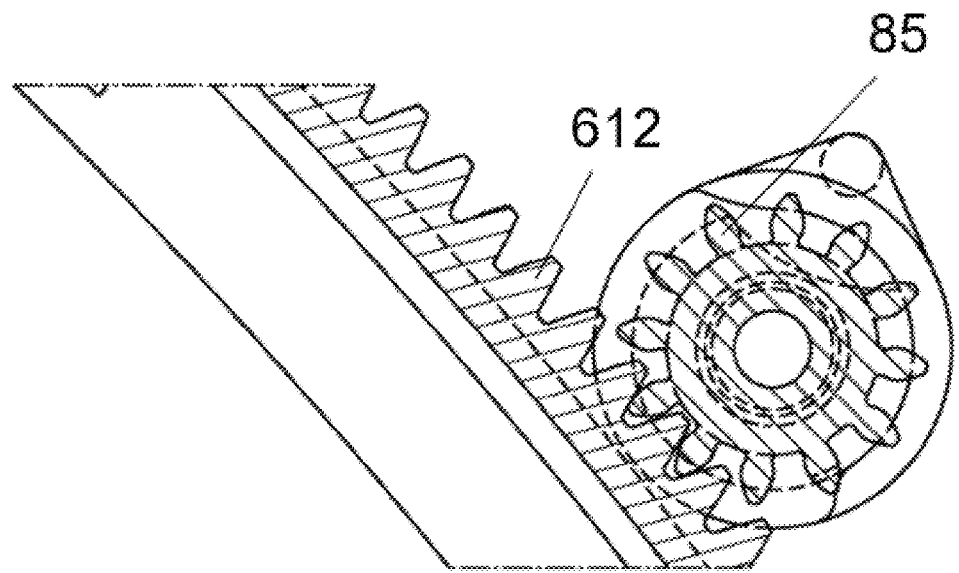
FIG. 24 shows a detailed view of the first pinion/gear wheel of the transmission mechanism and of the flap of the aerodynamic system of FIG. 15, the first transmission surface engaging the transmission surface of the flap.

The first gear 84 comprises a recessed projection 8411 with respect to the rest of the teeth of the first gear 84. Furthermore, the first rack 611 comprises a pair of recessed teeth 6111 with respect to the rest of the teeth of the first rack 611, as observed in FIG. 23. The cooperation between the recessed projection 8411 of the first gear 84 and the recessed teeth 6111 of the first rack 611 enables the engagement and disengagement action between the first gear 84 and the first rack 611, as shown in FIG. 23.

Figure 25:
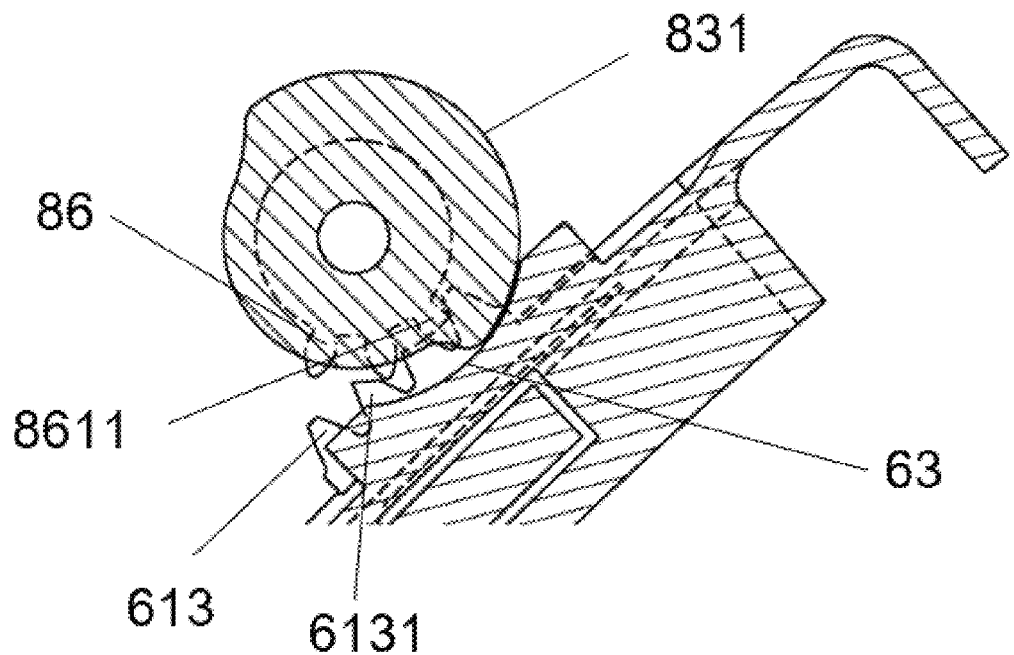
FIG. 25 shows a detailed view of the first pinion/gear wheel of the transmission mechanism and of the flap of the aerodynamic system of FIG. 15, the first transmission surface being ready for disengaging the transmission surface of the flap.

The third gear 86 comprises a recessed projection 8611 with respect to the rest of the teeth of the third gear 86. Furthermore, the third rack 613 comprises a pair of recessed teeth 6131 with respect to the rest of the teeth of the third rack 613, as observed in FIG. 25. The cooperation between the recessed projection 8611 of the third gear 86 and the recessed teeth 6131 of the third rack 613 enables the engagement and disengagement action between the third gear 86 and the third rack 613, as shown in FIG. 25.

Figure 20:
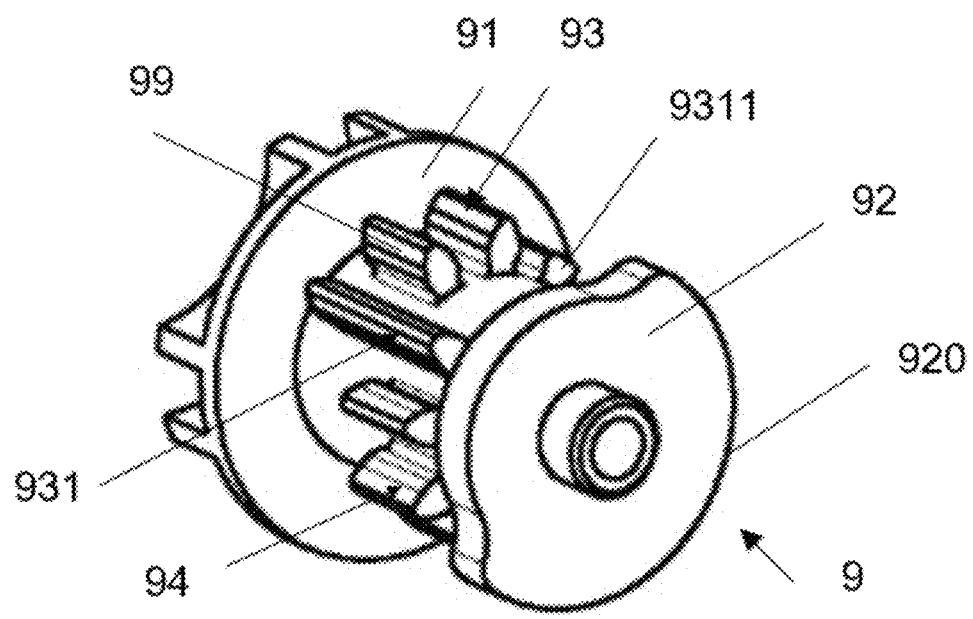
FIG. 20 shows a perspective view of the second pinion/gear wheel of the transmission mechanism of the aerodynamic system of FIG. 15.
Figure 21:
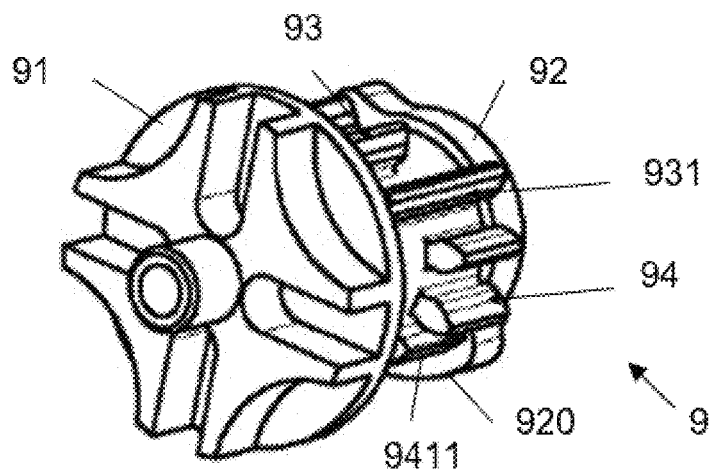
FIG. 21 shows a second perspective view of the second pinion/gear wheel of FIG. 20.

FIGS. 20 and 21 show the second pinion 9 of the second embodiment. The second pinion 9 comprises a first side area 91 and a second side area 92.

In this second embodiment, the first side area 91 is a Geneva drive, configured for cooperating with the coupling area 82 of the first driving wheel 8 as described above.

In this second embodiment, the second side area 92 of the second pinion 9 comprises a second convex-shaped blocking surface 920, having a diameter greater than the rest of the surface of this second side area 92, not constituting a blocking surface. The second blocking surface 920 is configured for being supported on a blocking surface 73 of the driven element 7 of the shutter device 3. The second blocking surface 920 of the second side area 92 of the second pinion 9 and the blocking surface 73 of the driven element 7 are complementary to one another.

In this second embodiment, and as shown in FIGS. 20 and 21, the second pinion 9 further comprises between the first side area 91 and the second side area 92 the first gear 93 and the second gear 94 configured for engaging the first and second racks 711 and 712 of the shutter device 3, respectively. The first and second gears 93 and 94 form the second transmission surface 931.

The first gear 93 comprises a recessed projection 9311 with respect to the rest of the teeth of the first gear 93. Furthermore, the first rack 711 comprises a pair of recessed teeth 7111 with respect to the rest of the teeth of the first rack 711, as observed in FIGS. 18 and 20. The cooperation between the recessed projection 9311 of the first gear 93 and the recessed teeth 7111 of the first rack 711 enables the engagement and disengagement action between the first gear 93 and the first rack 711.

The second gear 94 comprises a recessed projection 9411 with respect to the rest of the teeth of the second gear 94. Furthermore, the second rack 712 comprises a pair of recessed teeth 7121 with respect to the rest of the teeth of the third rack 712, as observed in FIGS. 18 and 21. The cooperation between the recessed projection 9411 of the second gear 94 and the recessed teeth 7121 of the second rack 712 enables the engagement and disengagement action between the second gear 94 and the second rack 712.

The manner in which the first pinion 8 and the driven element 6 arranged in the flap 2, and the second pinion 9 and the driven element 7 of the shutter device 3 interact when the actuator 4 transmits its movement to the first driving wheel 8 will be described below.

The aerodynamic system 1 of this second embodiment has the same four stable positions mentioned for the first embodiment. The control of the vehicle will order the actuator 4 to perform the movements required to transition from one stable position to another stable position.

In the first stable position, the shutter device 3 is in the closed position and the flap 2 is in the retracted position. In the first stable position, the first blocking surface 811 of the first side area 81 of the first pinion 8 is still facing the lower blocking surface 62 of the flap 2, whereas the first gear 93 of the second pinion 9 is ready to engage the first rack 71 of the driven element 7 of the shutter device 3.

Figure 22:
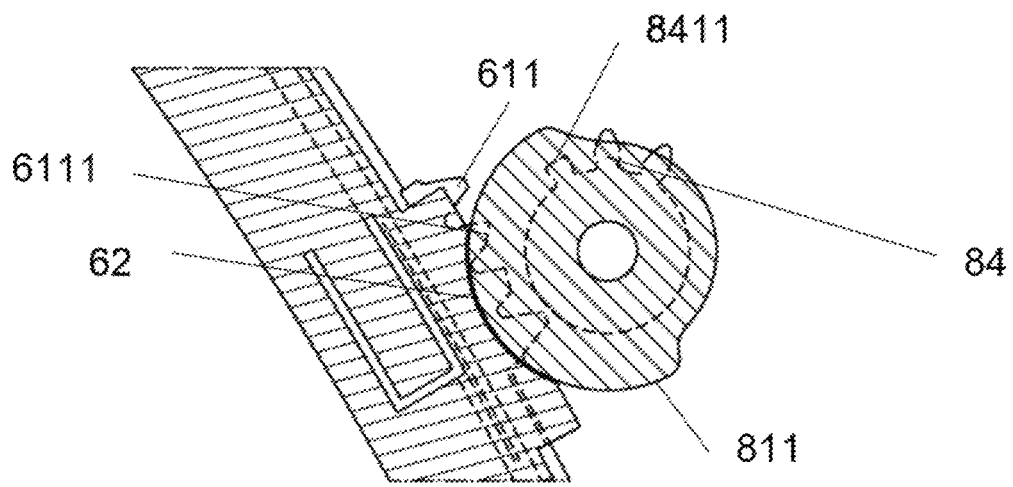
FIG. 22 shows a detailed view of the first pinion/gear wheel of the transmission mechanism and of the flap of the aerodynamic system of FIG. 15, the first blocking surface cooperating with the lower blocking surface of the flap.

Starting from the first stable position, if the actuator 4 rotates in the counter-clockwise direction, the first blocking surface 811 of the first side area 81 of the first pinion 8 cooperates with the lower blocking surface 62 of the flap 2, causing the flap 2 to remain immobile, as shown in FIG. 22. At the end of the transition from the first stable position to the second stable position, the first gear 84 will be ready to engage the first rack 611, as shown in FIG. 23.

On the other hand, the first gear 93 of the second pinion 9 will engage the first rack 71 of the driven element 7 of the shutter device 3, the shutter device 3 being displaced to the open position. At the end of the transition from the first stable position to the second stable position, the second blocking surface 920 of the second pinion 9 will be ready to fit in the blocking surface 73 of the shutter device 3.

In this second embodiment, to transition from the second stable position to the first stable position, the process described above would be carried out in the reverse order, as the actuator 4 rotates in the clockwise direction.

In the second stable position of this second embodiment, the shutter device 3 is in the open position and the flap 2 is in the retracted position.

Starting from this second stable position of this second embodiment, if the actuator 4 starts to rotate or continues to rotate in the counter-clockwise direction, the first, second and third gears 84, 85 and 86 forming the first transmission surface 841, engage the first, second and third racks 611, 612 and 613 forming the transmission surface 61 of the flap 2, the first transmission surface 841 transmits the movement of the actuator 4 to the transmission surface 61 of the flap 2, causing the flap 2 to be displaced to the deployed position. At the end of the transition from the second stable position to the third stable position, the first blocking surface 831 of the first pinion 8 will be ready to fit in the upper blocking surface 63 of the flap 2, as shown in FIG. 25.

On the other hand, the second blocking surface 920 of the second pinion 9 fits in the blocking surface 73 of the shutter device 3, causing the shutter device 3 to remain immobile. At the end of the transition from the second stable position to the third stable position, the second gear 94 will be ready to engage the second rack 712.

In this second embodiment, to transition from the third stable position to the second stable position, the process described above would be carried out in the reverse order, as the actuator 4 rotates in the clockwise direction.

In this third stable position, the shutter device 3 is in the open position and the flap 2 is in the deployed position.

Figure 26:
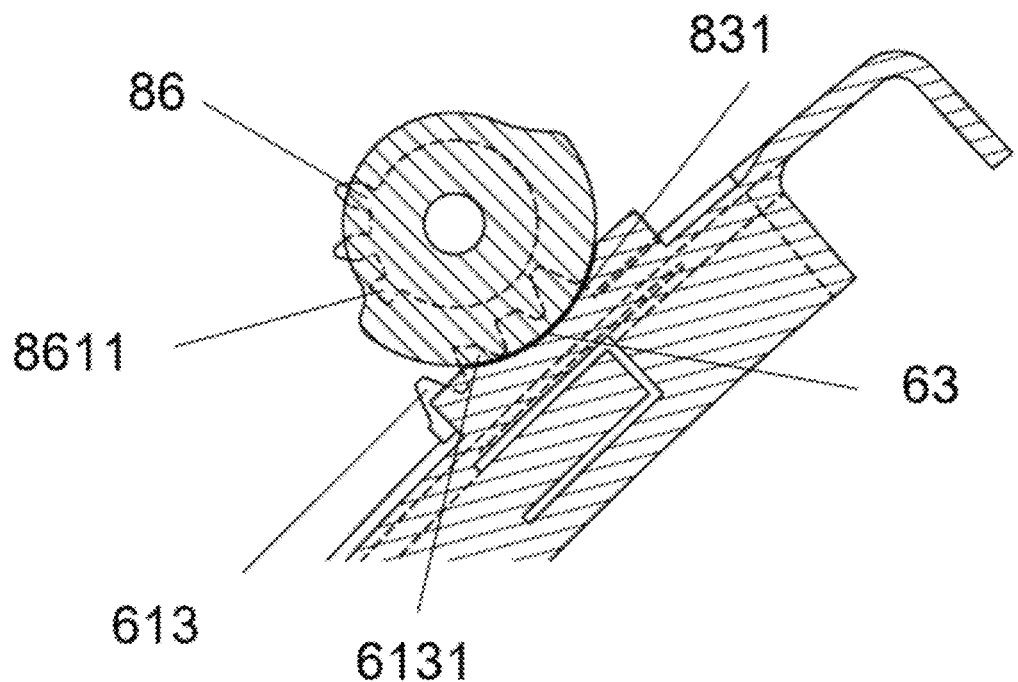
FIG. 26 shows a detailed view of the first pinion/gear wheel of the transmission mechanism and of the flap of the aerodynamic system of FIG. 15, the first blocking surface cooperating with the upper blocking surface of the flap.

Starting from this third stable position of this second embodiment, if the actuator 4 starts to rotate or continues to rotate in the counter-clockwise direction, the first blocking surface 831 of the second side area 83 of the first pinion 8 cooperates with the upper blocking surface 63 of the flap 2, causing the flap 2 to remain immobile, as shown in FIG. 26.

On the other hand, the second gear 94 of the second pinion 9 will engage the second rack 72 of the driven element 7 of the shutter device 3, the shutter device 3 being displaced to the closed position.

In this second embodiment, to transition from the fourth stable position to the third stable position, the process described above would be carried out in the reverse order, as the actuator 4 rotates in the clockwise direction.

In the two embodiments that have been described, it has been considered that the flap moves between two positions, and the shutter device moves between two positions as well. However, the fact that only two positions have been contemplated in each of them is not intended to be a limitation of the present invention, and in other embodiments the flap and the shutter device could transition through additional intermediate positions in addition to the two positions.

In both embodiments, it has been considered that in the first stable position the shutter device is in the closed position and the flap in the retracted position; in the second stable position the shutter device is in the open position and the flap in the retracted position; in the third stable position the shutter device is in the open position and the flap in the deployed position; and in the fourth stable position the shutter device is in the closed position and the flap in the deployed position. This combination of flap and shutter device states and positions are not intended to be a limitation of the present invention. In other embodiments, the stable states of the aerodynamic system could be other states and the order of the transitions between states could be different from those of the two embodiments described herein.

The following clauses disclose in an unlimited way embodiments of aerodynamic systems for a wheel housing of a vehicle.

Clause 1: Aerodynamic system for a wheel housing of a vehicle, comprising a flap (2) that can be displaced between a deployed position and a retracted position, a rotating actuator (4), and a transmission mechanism (5) coupled to the actuator (4) and configured for transmitting the movement of the actuator (4) to the flap (2), at least one air flow shutter device (3) in the wheel housing, where the shutter device (3) is facing at least one air duct (12) and where the shutter device (3) can be displaced between a closed position and an open position, where the transmission mechanism (5) is also configured for transmitting the movement of the actuator (4) to the shutter device (3).

Clause 2: Aerodynamic system according to clause 1, wherein the transmission mechanism (5) comprises at least a first transmission surface (911; 841) transmitting the movement of the actuator (4) to at least one transmission surface (61) of the flap (2) when the surfaces are coupled to one another, and at least a first blocking surface (912; 811, 831) blocking the flap (2) when it cooperates with at least one blocking surface (62, 63) of the flap (2), the transmission mechanism (5) also comprising at least a second transmission surface (921; 931) transmitting the movement of the actuator (4) to at least one transmission surface (71, 72; 71) of the shutter device (3) when the surfaces are coupled to one another, and at least a second blocking surface (922; 920) blocking the shutter device (3) when it cooperates with at least one blocking surface (73, 74, 75; 73) of the shutter device (3).

Clause 3: Aerodynamic system according to clause 2, wherein when the first transmission surface (911; 841) is coupled to the transmission surface (61) of the flap (2), the second blocking surface (922; 920) cooperates with the blocking surface (73, 74, 75; 73) of the shutter device (3), the flap (2) transitioning from one position to another and the shutter device (3) being kept immobile, and when the second transmission surface (921; 931) is coupled to the transmission surface (71, 72; 71) of the shutter device (3), the first blocking surface (912; 811, 831) cooperates with the blocking surface (62, 63) of the flap (2), the shutter device (3) transitioning from one position to another and the flap (2) being kept immobile.

Clause 4: Aerodynamic system according to clause 2 or 3, wherein when the first blocking surface (912; 811, 831) cooperates with the blocking surface (62, 63) of the flap (2), the first blocking surface (912; 811, 831) is displaced supported on the blocking surface (62, 63) of the flap (2), the flap (2) being kept immobile, and when the second blocking surface (922; 920) cooperates with the blocking surface (73, 74, 75; 73) of the shutter device (3), the second blocking surface (922; 920) is displaced supported on the blocking surface (73, 74, 75; 73) of the shutter device (3), the shutter device (3) being kept immobile.

Clause 5: Aerodynamic system according to clause 4, wherein the first blocking surface (912; 811, 831) and the second blocking surface (922; 920) are convex surfaces, the blocking surfaces (62, 63) of the flap (2) being concave surfaces complementary to the first blocking surface (912; 811, 831), and the blocking surfaces (73, 74, 75; 73) of the shutter device (3) being concave surfaces complementary to the second blocking surface (922; 920).

Clause 6: Aerodynamic system according to any of clauses 2 to 5, wherein the transmission of movement between transmission surfaces (911, 921, 61, 71, 72; 841, 931, 61, 71) is carried out by means of the cooperation of at least one projection (9110, 9210; 89, 99) of one of the surfaces with at least one housing (610, 710, 720; 69, 79) of the other surface.

Clause 7: Aerodynamic system according to clause 6, wherein the transmission surfaces (841, 931, 61, 71) comprise a plurality of alternating projections (89, 99) and housings (69, 79) forming rack and pinion-type connections, the transmission mechanism (5) comprising a first pinion (8) cooperating with a rack (611, 612, 613) arranged in the flap (2), and a second pinion (9) cooperating with a rack (711, 712) arranged in the shutter device (3).

Clause 8: Aerodynamic system according to clause 7, wherein the first pinion (8) is coupled to the actuator (4) and the first pinion (8) transmits rotation to the second pinion (9) by means of a turn reduction drive mechanism.

Clause 9: Aerodynamic system according to clause 8, wherein the turn reduction drive mechanism is a Geneva drive.

Clause 10: Aerodynamic system according to any of clauses 7 to 9, wherein the first pinion (8) comprises at least one recessed projection (8411, 8611) and the rack (611, 612, 613) of the flap (2) comprises at least one recessed projection (6111, 6131) at the beginning and/or at the end of the rack (611, 612, 613), such that it facilitates the engagement and disengagement function with respect to the first pinion (8), and the second pinion (9) comprises at least one recessed projection (9311, 9411) and the rack (711, 712) of the shutter device (3) comprises at least one recessed projection (7111, 7121) at the beginning and/or at the end of the rack (711, 712), such that it facilitates the engagement and disengagement function with respect to the second pinion (9).

Clause 11: Aerodynamic system according to any of the preceding clauses, wherein the displaceable shutter device (3) comprises a plurality of first openings (31) and a plurality of closing surfaces (32), where the shutter device (3) is configured so that when it is arranged in the closed position the first closing surfaces (32) coincide with openings (111) of the wheel housing (11) and so that when it is arranged in the open position the first openings (31) coincide with the openings (111) of the wheel housing (11).

Clause 12: A motor vehicle comprising an aerodynamic system according to any of the preceding clauses.

What is claimed is:

1. An aerodynamic system configured for use in a vehicle to regulate air flows from a forward part of the vehicle towards a wheel of a vehicle located rearward of the forward part, the system comprising:
    a shutter device having a forward side and a rear side and being configured to regulate a first air flow from the forward side to the rear side, the shutter device configured to be displaced in a closing direction towards a closed position and in an opening direction towards an open position, in the closed position the shutter device shuts off the first air flow, in the open position the shutter device opens the first air flow;
    a flap device that includes a flap having a forward side and a rear side, the flap being configured to be displaced in a downward deploying direction toward a deployed position and an upward retracting direction towards a retracted position, in the deployed position the flap projects downward a first distance from the retracted position for the purpose of opposing a second air flow, in the retracted position the flap does not project downward or projects downward a second distance from the retracted position less than the first distance to facilitate a passage of the second air flow;
    a rotating actuator; and
    a transmission mechanism coupled to the rotating actuator and configured to transmit the movement of the rotating actuator to cause the shutter device to be displaced between the open and closed positions and to transmit the movement of the actuator to cause the flap to be displaced between the deployed and retracted positions, wherein a movement of the shutter device between the open and closed positions does not result in a movement of the flap.

2. The aerodynamic system according to claim 1, wherein a displacement of the flap between the retracted and deployed positions does not result in a movement of the shutter device.

3. The aerodynamic system according to claim 1, wherein a displacement of the flap between the retracted and deployed positions does not result in a movement of the shutter device.

4. An aerodynamic system configured for use in a vehicle to regulate air flows from a forward part of the vehicle towards a wheel of a vehicle located rearward of the forward part, the system comprising:
    a shutter device having a forward side and a rear side and being configured to regulate a first air flow from the forward side to the rear side, the shutter device configured to be displaced in a closing direction towards a closed position and in an opening direction towards an open position, in the closed position the shutter device shuts off the first air flow, in the open position the shutter device opens the first air flow;
    a flap device that includes a flap having a forward side and a rear side, the flap being configured to be displaced in a downward deploying direction toward a deployed position and an upward retracting direction towards a retracted position, in the deployed position the flap projects downward a first distance from the retracted position for the purpose of opposing a second air flow, in the retracted position the flap does not project downward or projects downward a second distance from the retracted position less than the first distance to facilitate a passage of the second air flow;

a rotating actuator; and a transmission mechanism coupled to the rotating actuator and configured to transmit the movement of the rotating actuator to cause the shutter device to be displaced between the open and closed positions and to transmit the movement of the actuator to cause the flap to be displaced between the deployed and retracted positions, wherein:

the flap device includes a first transmission surface and a first blocking surface;

the shutter device includes a first transmission surface and a first blocking surface;

the transmission mechanism including a first transmission surface that is configured to engage with the first transmission surface of the flap device to transmit the movement of the rotating actuator into a movement of the flap in the deploying direction or the retracting direction;

the transmission mechanism including a first blocking surface that is configured to engage with the first blocking surface of the flap device to prevent movement of the flap in either of the deploying direction or the retracting direction;

the transmission mechanism including a second transmission surface that is configured to engage with the first transmission surface of the shutter device to transmit the movement of the rotating actuator into a movement of the shutter device in the opening direction or the closing direction; and the transmission mechanism including a second blocking surface that is configured to engage with the first blocking surface of the shutter device to prevent movement of the flap in either of the opening direction or the closing direction.

5. The aerodynamic system according to claim 4, wherein when the first transmission surface of the transmission mechanism is coupled to the first transmission surface of the flap device, the second blocking surface of the transmission mechanism cooperates with the first blocking surface of the shutter device, the flap is moved in the deploying direction or the retracting direction while the shutter device is prevented from moving.

6. The aerodynamic system according to claim 5, wherein when the second transmission surface of the transmission mechanism is coupled to the first transmission surface of the shutter device, the first blocking surface of the transmission mechanism cooperates with the first blocking surface of the flap device, the shutter device is moved in the opening direction or the closing direction while the and the flap is prevented from moving.

7. The aerodynamic system according to claim 4, wherein when the second transmission surface of the transmission mechanism is coupled to the first transmission surface of the shutter device, the first blocking surface of the transmission mechanism cooperates with the first blocking surface of the flap device, the shutter device is moved in the opening direction or the closing direction while the and the flap is prevented from moving.

8. The aerodynamic system according to claim 4 wherein when the first blocking surface of the transmission mechanism cooperates with the first blocking surface of the flap device, the first blocking surface of the transmission mechanism is displaced supported on the first blocking surface of the flap device with the flap being kept immobile, and when the second blocking surface of the transmission mechanism cooperates with the first blocking surface of the shutter device, the second blocking surface of the transmission mechanism is displaced supported on the first blocking surface of the shutter device, the shutter device being prevented from moving.

9. The aerodynamic system according to claim 8, wherein the first blocking surface and the second blocking surface of the transmission mechanism are convex surfaces, the first blocking surface of the flap device being a concave surface, and the first blocking surface of the shutter device being a concave surface.

10. The aerodynamic system according to claim 4, wherein the first and second transmission surfaces of the transmission mechanism respectively comprise first and second projections, the first transmission surface of the flap device comprising a first housing having walls on which the first projection acts to cause a movement of the flap in the deploying direction or in the retracting direction, the first transmission surface of the shutter device comprising a first housing having walls on which the second projection acts to cause a movement of the shutter device in the opening direction or in the closing direction position.

11. An aerodynamic system configured for use in a vehicle to regulate air flows from a forward part of the vehicle towards a wheel of a vehicle located rearward of the forward part, the system comprising:

a shutter device having a forward side and a rear side and being configured to regulate a first air flow from the forward side to the rear side, the shutter device configured to be displaced in a closing direction towards a closed position and in an opening direction towards an open position, in the closed position the shutter device shuts off the first air flow, in the open position the shutter device opens the first air flow;

a flap device that includes a flap having a forward side and a rear side, the flap being configured to be displaced in a downward deploying direction toward a deployed position and an upward retracting direction towards a retracted position, in the deployed position the flap projects downward a first distance from the retracted position for the purpose of opposing a second air flow, in the retracted position the flap does not project downward or projects downward a second distance from the retracted position less than the first distance to facilitate a passage of the second air flow;

a rotating actuator; and a transmission mechanism coupled to the rotating actuator and configured to transmit the movement of the rotating actuator to cause the shutter device to be displaced between the open and closed positions and to transmit the movement of the actuator to cause the flap to be displaced between the deployed and retracted positions, wherein the transmission mechanism comprises a first plurality of transmission surfaces disposed about a first gear wheel and the flap device comprises a first rack having a plurality of transmission surfaces, the plurality of transmission surfaces of the first rack configured to engage with the first plurality of transmission surfaces of the first gear wheel to cause the flap device to be moved in either the deploying direction or the retracting direction, the transmission mechanism further comprising a second plurality of transmission surfaces disposed about a second gear wheel and the shutter device comprises a first rack having a plurality of transmission surfaces, the plurality of transmission surfaces of the first rack of the shutter device configured to engage with the plurality of transmission surfaces of the second gear wheel to cause the shutter device to be moved in either the opening direction or the closing direction.

12. The aerodynamic system according to claim 11, wherein each of the flap device, shutter device, first gear wheel and second gear wheel includes a blocking surface, the blocking surface of the first gear wheel configured to engage with the blocking surface of the flap device to prevent movement of the flap in either of the deploying direction or the retracting direction, the blocking surface of the second gear wheel configured to engage with the blocking surface of the shutter device to prevent movement of the shutter device in either of the opening direction or the closing direction.

13. The aerodynamic system according to claim 12, wherein the first gear wheel is coupled to the second gear wheel by a turn reduction drive mechanism that transmits a rotation of the first gear wheel to the second gear wheel or a rotation of the second gear wheel to the first gear wheel.

14. The aerodynamic system according to claim 13, wherein the first gear wheel is coupled to and rotated by the rotating actuator.

15. The aerodynamic system according to claim 14, wherein the flap device includes first and second blocking surfaces respectively located at opposing first and second ends of the first rack of the flap device.

16. The aerodynamic system according to claim 12, wherein when the plurality of transmission surfaces of the first rack of the flap engage with the first plurality of transmission surfaces of the first gear wheel of the transmission mechanism causing the flap device to be moved, the blocking surface of the second gear wheel engages with the blocking surface of the shutter device preventing movement of the shutter device.

17. The aerodynamic system according to claim 16, wherein when the plurality of transmission surfaces of the first rack of the shutter device engage with the plurality of transmission surfaces of the second gear wheel causing the shutter device to move, the blocking surface of the first gear wheel engages with the blocking surface of the flap device preventing movement of the flap.

18. The aerodynamic system according to claim 12, wherein when the plurality of transmission surfaces of the first rack of the shutter device engage with the plurality of transmission surfaces of the second gear wheel causing the shutter device to move, the blocking surface of the first gear wheel engages with the blocking surface of the flap device preventing movement of the flap.

19. The aerodynamic system according to claim 11, wherein the plurality of transmission surfaces of the first gear wheel comprises a plurality of radial projections that includes one or more recessed projection, the plurality of transmission surfaces of the first rack of the flap device comprises a plurality of projections that includes a recessed projection located at an end of the first rack of the flap device, the first recessed projections of the first gear wheel and the first rack of the flap device configured to facilitate an engagement and disengagement of the first gear wheel with the first rack of the flap device, the plurality of transmission surfaces of the second gear wheel comprises a plurality of radial projections that includes a recessed projection, the plurality of transmission surfaces of the first rack of the shutter device comprises a plurality of projections that includes a recessed projection located at an end of the first rack of the shutter device, the first recessed projections of the second gear wheel and the first rack of the shutter device configured to facilitate an engagement and disengagement of the second gear wheel with the first rack of the shutter device.

* * * * *

UNITED STATES PATENT AND TRADEMARK OFFICE
CERTIFICATE OF CORRECTION

PATENT NO. : 10,518,827 B2  
APPLICATION NO. : 16/169361  
DATED : December 31, 2019  
INVENTOR(S) : Ibañez Moreira et al.

Page 1 of 1

It is certified that error appears in the above-identified patent and that said Letters Patent is hereby corrected as shown below:

In the Claims

Column 19, Line 39, Claim 4 replace "flap" with --shutter device--.

Signed and Sealed this  
Thirty-first Day of August, 2021

Drew Hirshfeld  
*Performing the Functions and Duties of the*  
*Under Secretary of Commerce for Intellectual Property and*  
*Director of the United States Patent and Trademark Office*